(12) United States Patent
Beuses et al.

(10) Patent No.: US 12,520,937 B2
(45) Date of Patent: Jan. 13, 2026

(54) STORAGE SYSTEMS INCLUDING BACK CHANNELS AND WALLS MOUNTABLE ALONG THE BACK CHANNELS

(71) Applicant: Clairson, Inc., Newark, DE (US)

(72) Inventors: Enrique Beuses, Gainesville, FL (US); Thomas Jones, Ocala, FL (US); Ryan Bishop, Ocala, FL (US)

(73) Assignee: Clairson, Inc., Newark, DE (US)

( * ) Notice: Subject to any disclaimer, the term of this patent is extended or adjusted under 35 U.S.C. 154(b) by 0 days.

(21) Appl. No.: 18/897,857

(22) Filed: Sep. 26, 2024

(65) Prior Publication Data

US 2025/0127296 A1  Apr. 24, 2025

Related U.S. Application Data

(63) Continuation of application No. 18/441,155, filed on Feb. 14, 2024, now Pat. No. 12,137,802, which is a
(Continued)

(51) Int. Cl.
*A47B 61/00* (2006.01)
*A47B 95/00* (2006.01)
(Continued)

(52) U.S. Cl.
CPC ............ *A47B 61/003* (2013.01); *A47B 95/00* (2013.01); *A47B 95/008* (2013.01);
(Continued)

(58) Field of Classification Search
CPC ..... A47B 61/003; A47B 95/00; A47B 95/043; A47B 96/02; A47B 61/04; A47B 95/008;
(Continued)

(56) References Cited

U.S. PATENT DOCUMENTS 560,884 A    5/1896  Anderson
1,325,143 A  12/1919 Conterio
(Continued)

OTHER PUBLICATIONS www.closetmaid.com/en-us/Search, accessed Aug. 13, 2016, 2 pages.
(Continued)

*Primary Examiner* — Ko H Chan
(74) *Attorney, Agent, or Firm* — Brooks Kushman P.C.

(57) ABSTRACT

An exemplary storage system generally includes a least one back channel mountable along a support surface (e.g., a back wall of a closet, etc.). At least one wall or panel of the storage system is mountable (e.g., via a connector, etc.) along the back channel. The storage system may also generally include one or more of a hang rod, side bracket, shelf trim, end cup, support bracket, and/or shelf. The shelf may be supportable by the back channel, a pair of side brackets, and at least one support bracket. The side brackets may be mountable along sidewalls of the closet and/or to the at least one wall or the storage system that is mountable along the back channel. The hang rod may supportable beneath the shelf when first and second end portions of the hang rod are supported by respective first and second end cups.

20 Claims, 29 Drawing Sheets

Related U.S. Application Data continuation of application No. 17/480,602, filed on Sep. 21, 2021, now Pat. No. 11,950,691, which is a continuation of application No. 16/984,687, filed on Aug. 4, 2020, now Pat. No. 11,206,923, which is a continuation of application No. 16/036,394, filed on Jul. 16, 2018, now Pat. No. 11,470,962, which is a continuation-in-part of application No. 15/683,863, filed on Aug. 23, 2017, now Pat. No. 10,021,974, which is a continuation of application No. 15/434,877, filed on Feb. 16, 2017, now Pat. No. 9,743,762.

(60) Provisional application No. 62/643,066, filed on Mar. 14, 2018, provisional application No. 62/451,168, filed on Jan. 27, 2017, provisional application No. 62/379,046, filed on Aug. 24, 2016.

(51) Int. Cl.
*A47B 95/04* (2006.01)
*A47B 96/02* (2006.01)
*A47B 96/06* (2006.01)
*A47G 25/06* (2006.01)

(52) U.S. Cl.
CPC ............ *A47B 95/043* (2013.01); *A47B 96/02* (2013.01); *A47B 96/067* (2013.01); *A47G 25/06* (2013.01); *A47G 25/0692* (2013.01)

(58) Field of Classification Search
CPC ..... A47B 96/024; A47B 96/06; A47B 96/067; A47G 25/06; A47G 25/0692
See application file for complete search history.

(56) References Cited

U.S. PATENT DOCUMENTS

| | | | |
|---|---|---|---|
| 2,441,721 A | 5/1948 | Schroeder | |
| 2,708,147 A * | 5/1955 | Burke | A47B 77/04 |
| | | | 248/220.21 |
| 2,733,887 A | 2/1956 | Schmidt | |
| 2,859,879 A | 11/1958 | Rogers et al. | |
| 3,025,122 A | 3/1962 | Millman | |
| 3,042,978 A * | 7/1962 | Eames | A47B 47/00 |
| | | | 52/64 |
| 3,088,560 A | 5/1963 | Preuss | |
| 3,209,710 A | 10/1965 | Hines | |
| 3,362,768 A | 1/1968 | Fink et al. | |
| 3,437,214 A | 4/1969 | Sainsbury | |
| 3,563,182 A | 2/1971 | Kensington et al. | |
| 3,596,942 A | 8/1971 | Zoebelein | |
| 3,634,983 A * | 1/1972 | Welch | A47B 96/067 |
| | | | 211/90.01 |
| 3,664,011 A | 5/1972 | Labastrou | |
| 3,680,898 A | 8/1972 | Herrmann | |
| 3,688,915 A | 9/1972 | Ramsey | |
| 3,702,591 A | 11/1972 | Banse | |
| 3,749,465 A | 7/1973 | Newcomer | |
| 3,784,273 A | 1/1974 | Nikolai | |
| 3,798,865 A | 3/1974 | Curtis | |
| 3,899,228 A * | 8/1975 | Schreiber | A47B 96/00 |
| | | | 312/107 |
| 3,984,077 A | 10/1976 | Shine | |
| 3,989,399 A | 11/1976 | Slowbe | |
| 4,178,047 A | 12/1979 | Welch | |
| 4,372,516 A | 2/1983 | Nyquist | |
| 4,373,448 A | 2/1983 | Pallotta | |
| 4,407,476 A | 10/1983 | Bohannan | |
| 4,439,971 A | 4/1984 | Rutherford | |
| 4,601,247 A | 7/1986 | Welch et al. | |
| 4,603,781 A | 8/1986 | Ryan, Jr. | |
| 4,887,783 A * | 12/1989 | Franklin | A47F 5/0815 |
| | | | 248/225.11 |
| 4,928,833 A * | 5/1990 | Huizenga | A47B 95/008 |
| | | | 211/187 |
| 4,973,187 A | 11/1990 | Sauder | |
| 5,050,832 A * | 9/1991 | Lee | A47B 95/008 |
| | | | 248/222.51 |
| 5,064,158 A | 11/1991 | Brazier et al. | |
| D331,187 S | 11/1992 | Bennett | |
| 5,222,611 A | 6/1993 | Wood et al. | |
| 5,297,486 A | 3/1994 | Herrmann et al. | |
| 5,332,611 A | 7/1994 | Shanok et al. | |
| 5,351,842 A | 10/1994 | Remmers | |
| 5,355,810 A | 10/1994 | Camilleri | |
| 5,439,123 A * | 8/1995 | Nook | A47B 57/04 |
| | | | 211/187 |
| 5,580,018 A | 12/1996 | Remmers | |
| 5,582,303 A | 12/1996 | Sloan | |
| 5,718,493 A * | 2/1998 | Nikolai | A47B 88/941 |
| | | | 403/68 |
| 5,895,020 A | 4/1999 | Danzyger et al. | |
| 5,964,438 A * | 10/1999 | Camilleri | A47B 95/008 |
| | | | 248/323 |
| 6,053,465 A | 4/2000 | Kluge | |
| 6,073,784 A | 6/2000 | Hattingh et al. | |
| 6,105,233 A | 8/2000 | Neal | |
| 6,113,201 A | 9/2000 | Bauer | |
| D437,515 S | 2/2001 | Remmers et al. | |
| 6,209,976 B1 | 4/2001 | Shear | |
| 6,227,506 B1 | 5/2001 | Benedict | |
| 6,267,063 B1 | 7/2001 | Cline | |
| 6,318,684 B1 | 11/2001 | Ireland et al. | |
| 6,581,788 B1 | 6/2003 | Winig et al. | |
| 6,786,562 B2 | 9/2004 | Obrock et al. | |
| 6,935,518 B2 | 8/2005 | Winig et al. | |
| 6,994,411 B2 | 2/2006 | Johnson | |
| D527,559 S | 9/2006 | Remmers | |
| 7,150,364 B2 | 12/2006 | Jablow et al. | |
| 7,198,159 B2 | 4/2007 | Fischer | |
| 7,784,626 B2 | 8/2010 | Jacques et al. | |
| 8,132,768 B2 | 3/2012 | Fernandez et al. | |
| 8,177,311 B2 | 5/2012 | Apgood, II et al. | |
| 8,534,783 B2 | 9/2013 | Nash et al. | |
| 8,550,265 B2 | 10/2013 | Botkin | |
| 8,646,624 B2 | 2/2014 | Fernandez et al. | |
| 8,662,323 B1 | 3/2014 | Billman | |
| 8,833,572 B1 * | 9/2014 | Billman | A47B 45/00 |
| | | | 211/187 |
| 8,851,307 B2 | 10/2014 | Lefevre et al. | |
| 8,882,065 B2 | 11/2014 | Henriott et al. | |
| 8,998,008 B1 | 4/2015 | Robertson | |
| 9,004,427 B2 | 4/2015 | Irudayaraj et al. | |
| 9,033,294 B2 | 5/2015 | Cattaneo | |
| 9,402,476 B2 | 8/2016 | Crandall | |
| D859,138 S | 9/2019 | Thompson | |
| 10,738,457 B1 | 8/2020 | Hendry | |
| 10,750,864 B2 | 8/2020 | Cattaneo | |
| D896,623 S | 9/2020 | Ercole Auffray et al. | |
| D941,499 S | 1/2022 | Hendry | |
| D947,658 S | 4/2022 | Wang | |
| D948,315 S | 4/2022 | Pavlov | |
| D959,237 S | 8/2022 | Mantenuto | |
| D960,687 S | 8/2022 | Underwood | |
| 12,035,805 B2 * | 7/2024 | Shen | A47B 77/00 |
| 2006/0011568 A1 | 1/2006 | Remmers et al. | |
| 2006/0091271 A1 * | 5/2006 | Nowak | A47B 95/008 |
| | | | 248/225.21 |
| 2007/0084568 A1 | 4/2007 | Nien | |
| 2007/0181759 A1 | 8/2007 | Young | |
| 2007/0187561 A1 | 8/2007 | Xayoiphonh | |
| 2008/0010935 A1 | 1/2008 | Nagel et al. | |
| 2008/0224579 A1 * | 9/2008 | Juten | A47B 96/067 |
| | | | 312/111 |
| 2009/0108719 A1 | 4/2009 | Lilly | |
| 2009/0152217 A1 * | 6/2009 | Gmerek | A47F 5/0838 |
| | | | 211/27 |
| 2011/0147551 A1 * | 6/2011 | Richard | A47B 96/067 |
| | | | 29/428 |
| 2011/0309731 A1 * | 12/2011 | Lindvall | A47B 95/008 |
| | | | 312/352 |

(56) References Cited

U.S. PATENT DOCUMENTS

| | | | |
|---|---|---|---|
| 2012/0018396 A1* | 1/2012 | Susan, Jr. | A47B 96/067 211/90.01 |
| 2013/0056434 A1 | 3/2013 | Artigues et al. | |
| 2015/0027972 A1 | 1/2015 | Andersson et al. | |
| 2018/0042378 A1* | 2/2018 | Kilburn | E05D 15/58 |
| 2018/0279782 A1 | 10/2018 | Liss et al. | |
| 2019/0219080 A1* | 7/2019 | Schmid-Koemmerling | A47B 91/08 |
| 2022/0151385 A1* | 5/2022 | Graber | A47B 96/067 |

OTHER PUBLICATIONS

ClosetMaid Express Shelf Installation Video, https://www.youtube.com/watch?v=RZzhB6ENBRA, Jan. 17, 2017, 1 page.

U.S. Office Action for U.S. Appl. No. 16/036,394, dated Nov. 18, 2021, 15 pages.

U.S. Office Action for U.S. Appl. No. 16/036,394, dated Dec. 23, 2020, 14 pages.

U.S. Office Action for U.S. Appl. No. 16/036,394, dated Mar. 8, 2022, 7 pages.

U.S. Office Action for U.S. Appl. No. 16/036,394, dated May 11, 2021, 14 pages.

* cited by examiner

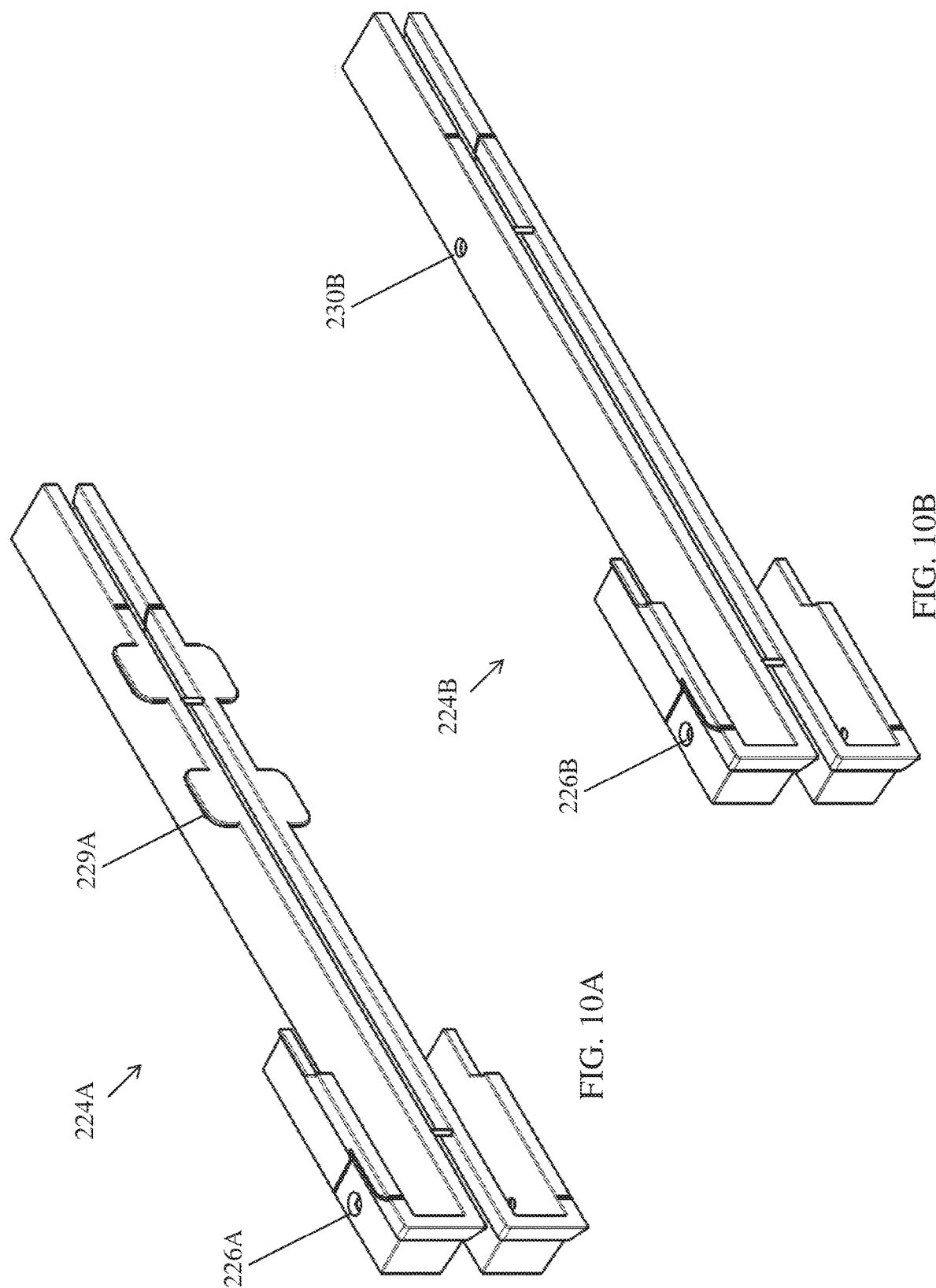

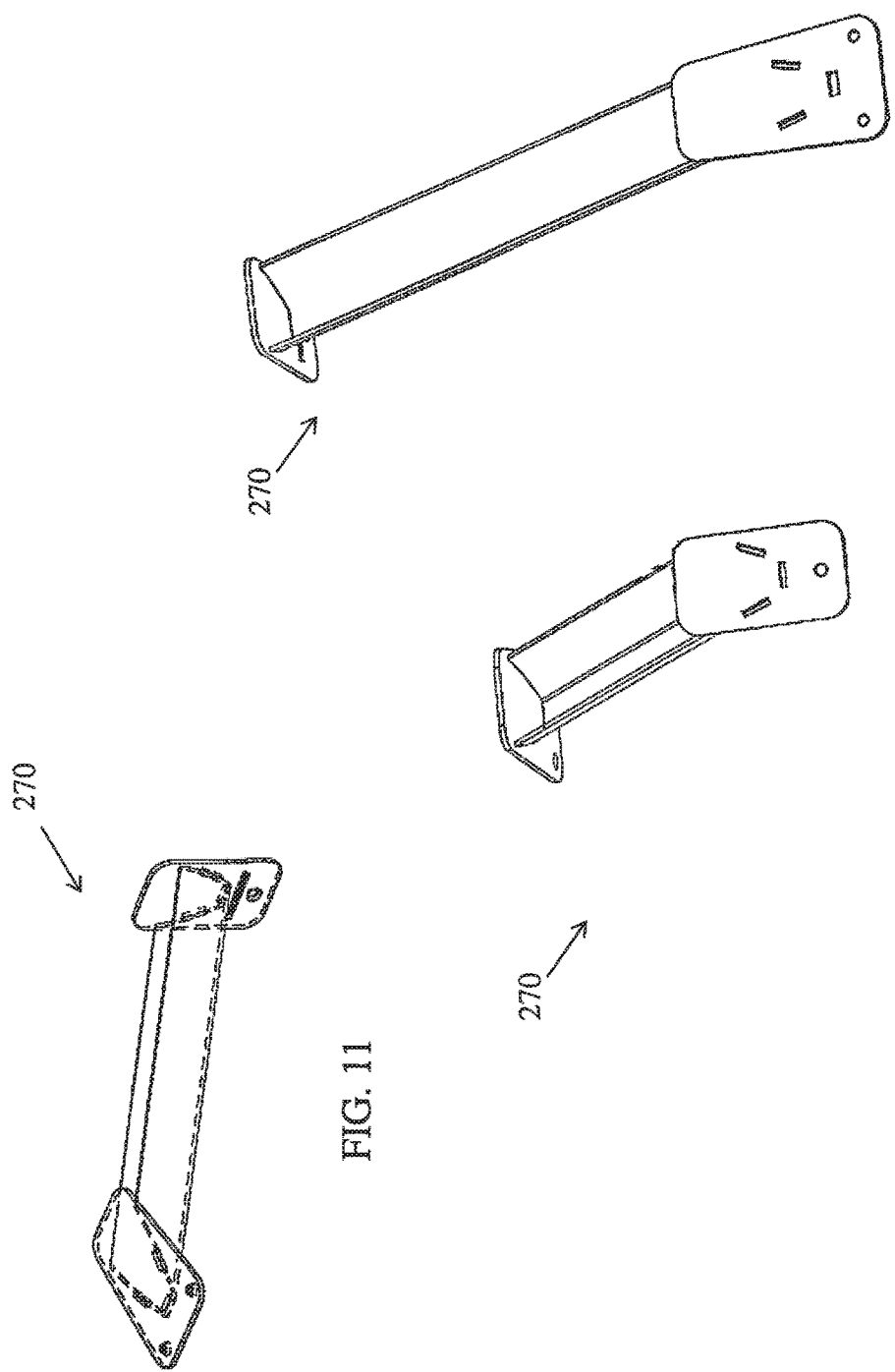

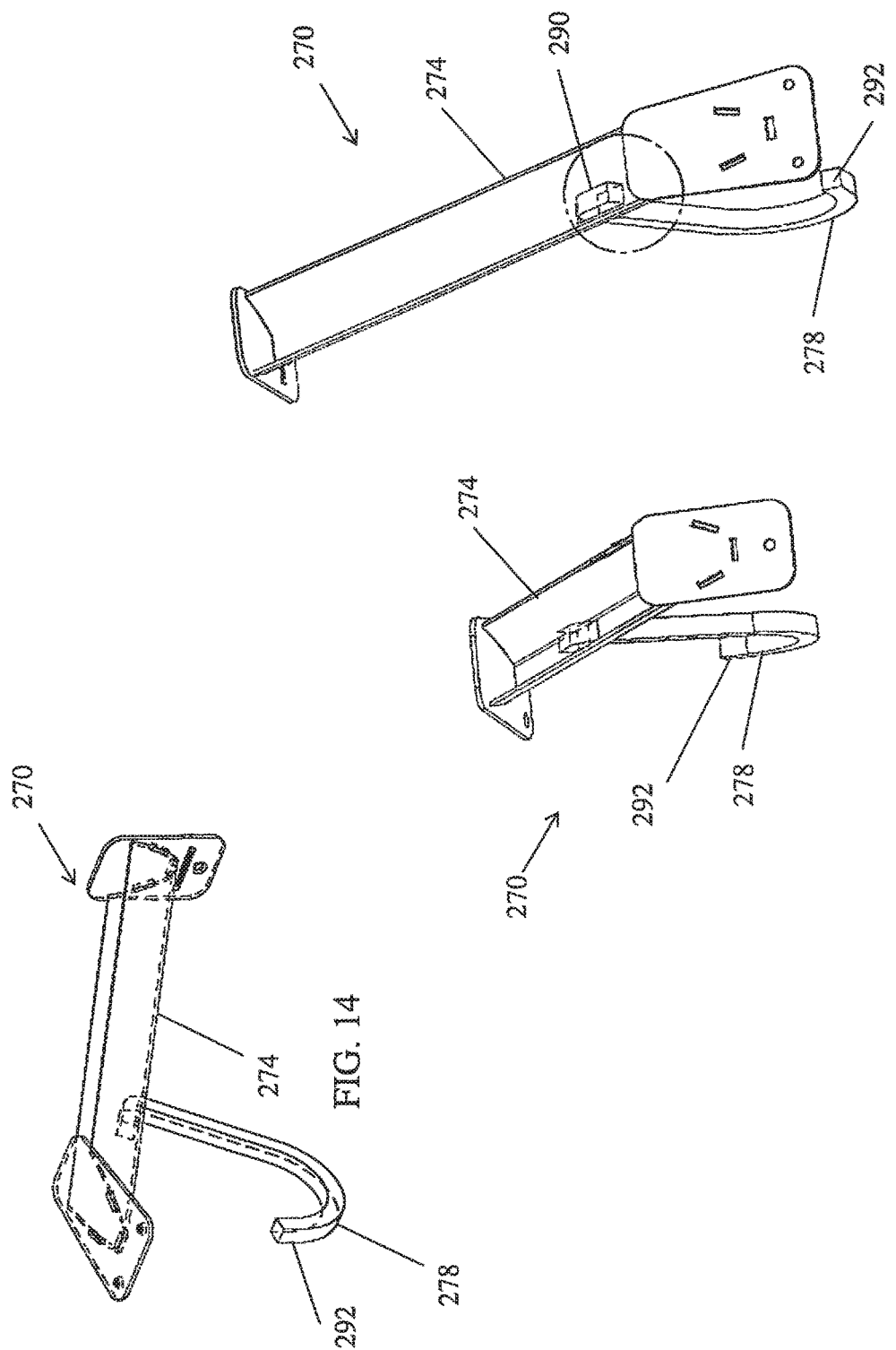

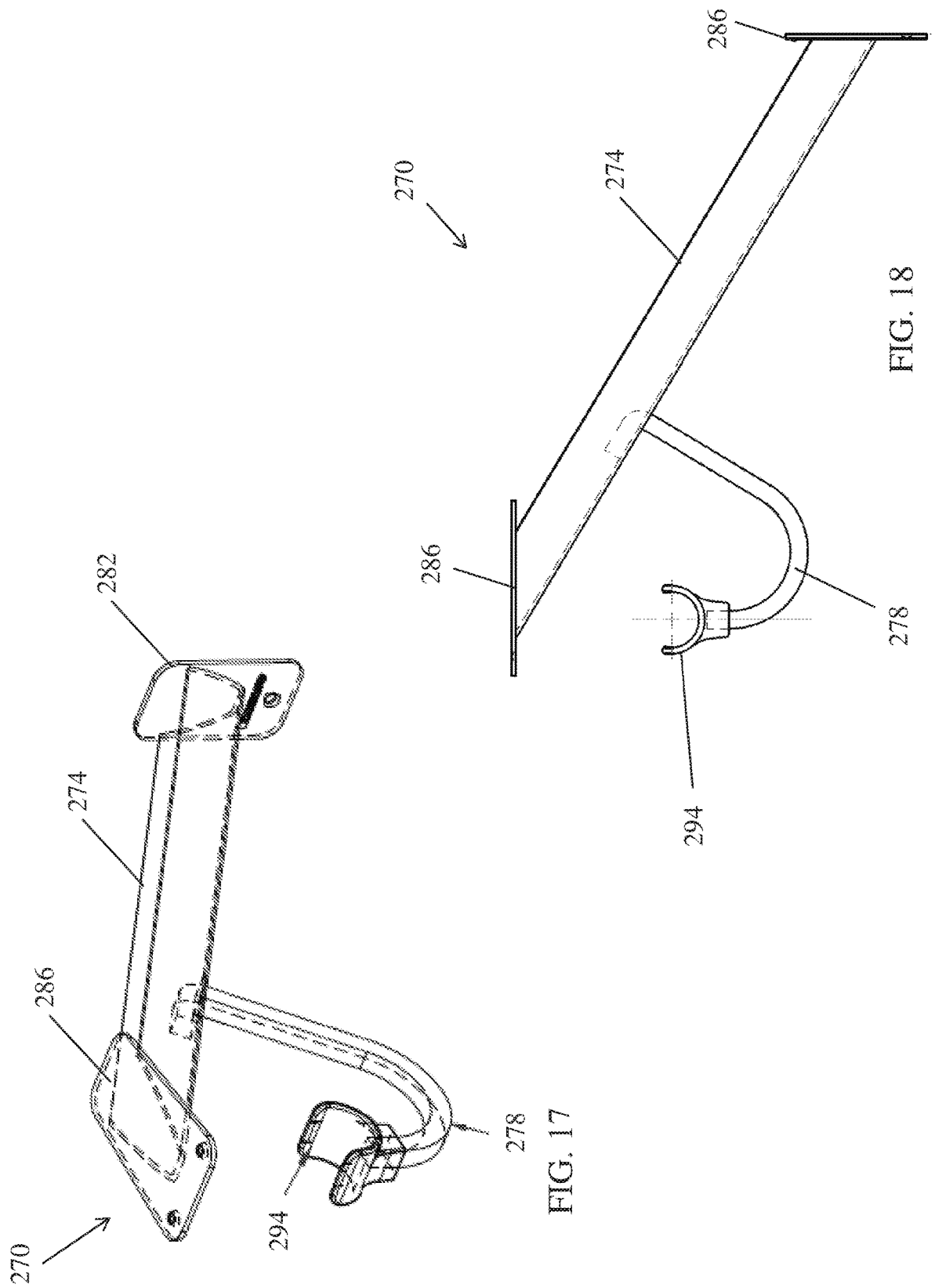

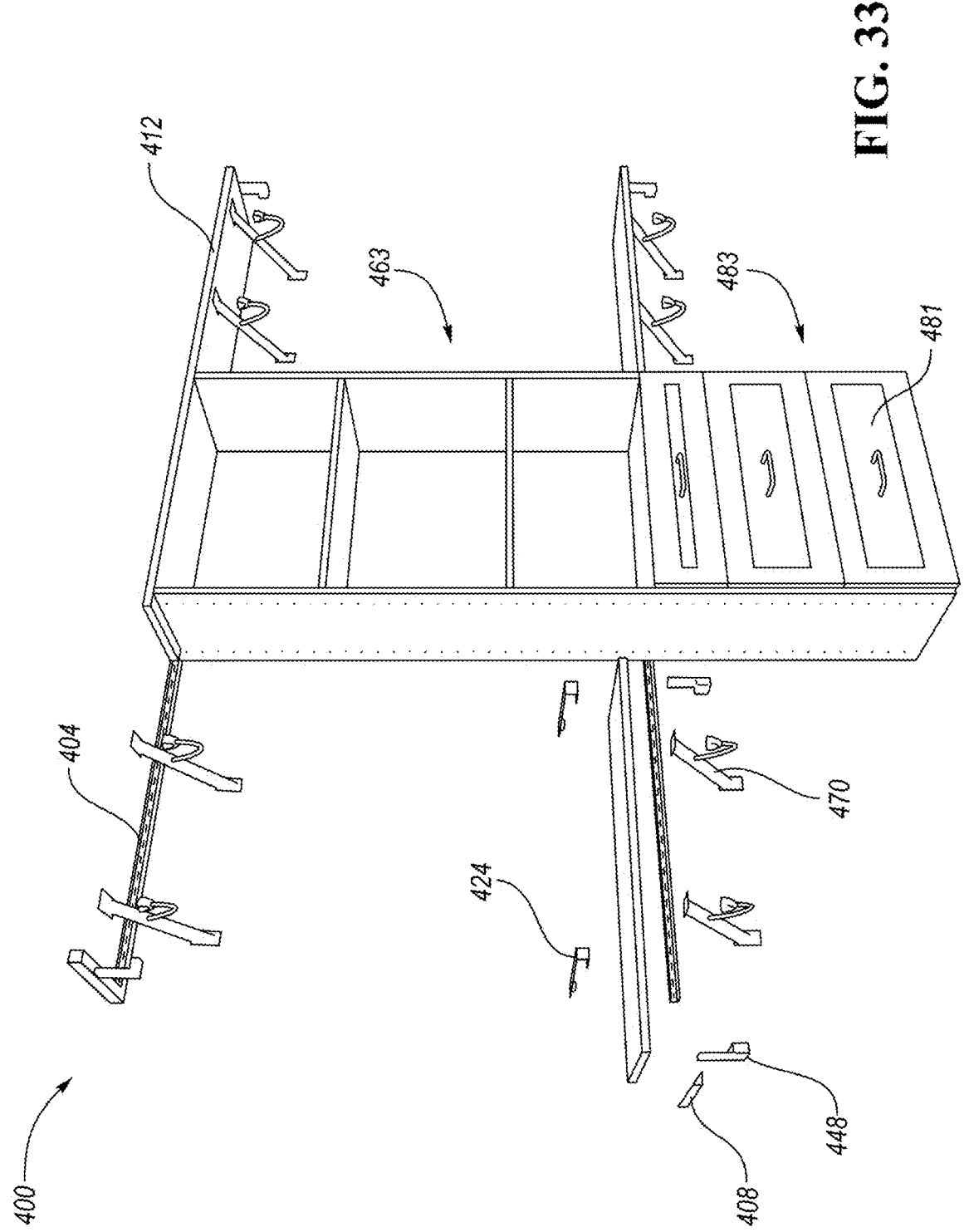

4. ADD TOP SHELF

4. ADD LOWER SHELF

1. ADD TOWER

4. ADD CENTER SUPPORTS

4. ADD POLE CUPS

4. ADD POLES

4. ADD TRIM

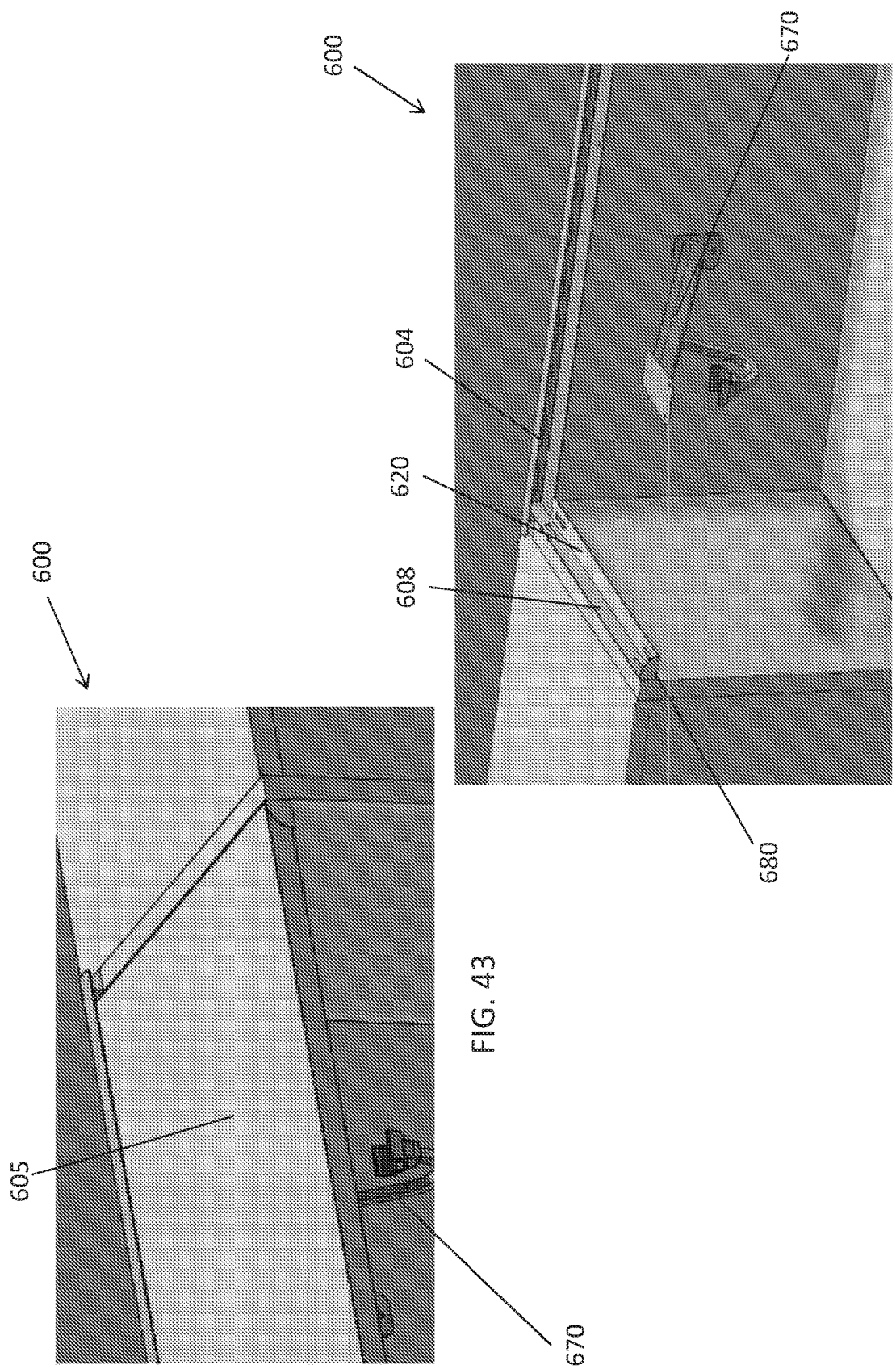

STORAGE SYSTEMS INCLUDING BACK CHANNELS AND WALLS MOUNTABLE ALONG THE BACK CHANNELS

CROSS-REFERENCE TO RELATED APPLICATIONS

This application is a continuation of U.S. application Ser. No. 18/441,155 filed Feb. 14, 2024, now U.S. Pat. No. 12,137,802, which is a continuation of U.S. application Ser. No. 17/480,602 filed Sep. 21, 2021, now U.S. Pat. No. 11,950,691, which is a continuation of U.S. application Ser. No. 16/984,687 filed Aug. 4, 2020, now U.S. Pat. No. 11,206,923, which is a continuation of U.S. application Ser. No. 16/036,394 filed Jul. 16, 2018, now U.S. Pat. No. 11,470,962, which claims the benefit of U.S. provisional application Ser. No. 62/643,066 filed Mar. 14, 2018, and is a continuation-in-part of U.S. application Ser. No. 15/683,863 filed Aug. 23, 2017, now U.S. Pat. No. 10,021,974, which is a continuation of U.S. application Ser. No. 15/434,877 filed Feb. 16, 2017, now U.S. Pat. No. 9,743,762, which claims the benefit of U.S. provisional application Ser. No. 62/379,046 filed Aug. 24, 2016 and U.S. provisional application Ser. No. 62/451,168 filed Jan. 27, 2017, the disclosures of which are hereby incorporated in their entirety by reference herein.

TECHNICAL FIELD

The present disclosure generally relates to storage systems, such as a closet storage system including a least one back channel mountable along a support surface (e.g., a back wall of a closet, etc.). At least one wall or panel of the storage system in mountable (e.g., via a connector, etc.) along the back channel.

BACKGROUND

This section provides background information related to the present disclosure which is not necessarily prior art.

Efficient and organized use of building space is very desirable, particularly with respect to storage or utility space in businesses, residential homes, and apartments. In particular, because of the limited or tight spaces in these locations, increasing the amount of useable space is very important. Likewise, providing ease in access and increased user convenience is important.

With respect to closet organization and the design of closet storage units, particularly for residential use, many different options are available including, for example, different sizes and shapes of shelves, different attachment and mounting members and different storage members (e.g., wire baskets, shoe-stands, tie/belt racks, hang rods, etc.). Ease in accessing stored items, such as clothing, is important. Further, ease in moving stored items to make room for other items or to access items not readily accessible, is likewise important. For example, poles or hang rods may be supported beneath a shelf to provide for relatively easy movement of items along the hang rod, for example, sliding clothes on hangers along the pole or hang rod.

BRIEF DESCRIPTION OF THE DRAWINGS

The drawings described herein are for illustrative purposes only of selected embodiments and not all possible implementations, and are not intended to limit the scope of the present disclosure.

FIGS. 10A and 10B are perspective views of two alternative pairs of shelf trim pieces that may be used with the storage system shown in FIG. 7 in exemplary embodiments.

FIGS. 11, 12, and 13 are perspective views of an exemplary support bracket that may be used with the storage system shown in FIG. 7 in exemplary embodiments.

FIGS. 14, 15, and 16 are perspective views of a hang rod hook coupled to the support bracket shown in FIG. 11 that may be used with the storage system shown in FIG. 7 in exemplary embodiments.

FIG. 17 is a perspective view of the support bracket and hang rod hook shown in FIG. 14, and also showing a pole cup (e.g., saddle or cradle, etc.) coupled to an end portion of the hang rod hook, where the support bracket, hang rod hook, and pole cup may be used with the storage system shown in FIG. 7 in exemplary embodiments.

FIG. 18 is a side view of the support bracket, hang rod hook, and pole cup assembly shown in FIG. 17.

FIG. 33 is a perspective view of an exemplary embodiment of a storage system that includes a tower unit (e.g., drawers, cabinets, etc.) that can be assembled on the ground and that is movable along a back channel (broadly, a back support member) before being secured in place.

FIG. 43 is a perspective view showing a portion of storage system according to an exemplary embodiment that does not include a trim piece along the side edge portion of the shelf.

FIG. 44 is a perspective view showing the portion of storage system shown in FIG. 43 without the shelf in order to illustrate the side channel or bracket (broadly, side support member) concealed by the shelf in FIG. 40.

Corresponding reference numerals indicate corresponding parts throughout the several views of the drawings.

DETAILED DESCRIPTION

Example embodiments will now be described more fully with reference to the accompanying drawings.

According to various aspects of the present disclosure, exemplary embodiments are disclosed of systems and methods for supporting shelves and hang rods from support surfaces, such as the walls of a closet or cabinet, among other suitable surfaces associated with storage systems and areas. As disclosed herein, exemplary embodiments advantageously may be installed within a closet, etc., relatively quickly, e.g., twice as fast as a conventional closet storage system may be installed in a closet, within 10 to 20 minutes instead of 45 minutes, etc.

Figure 1:
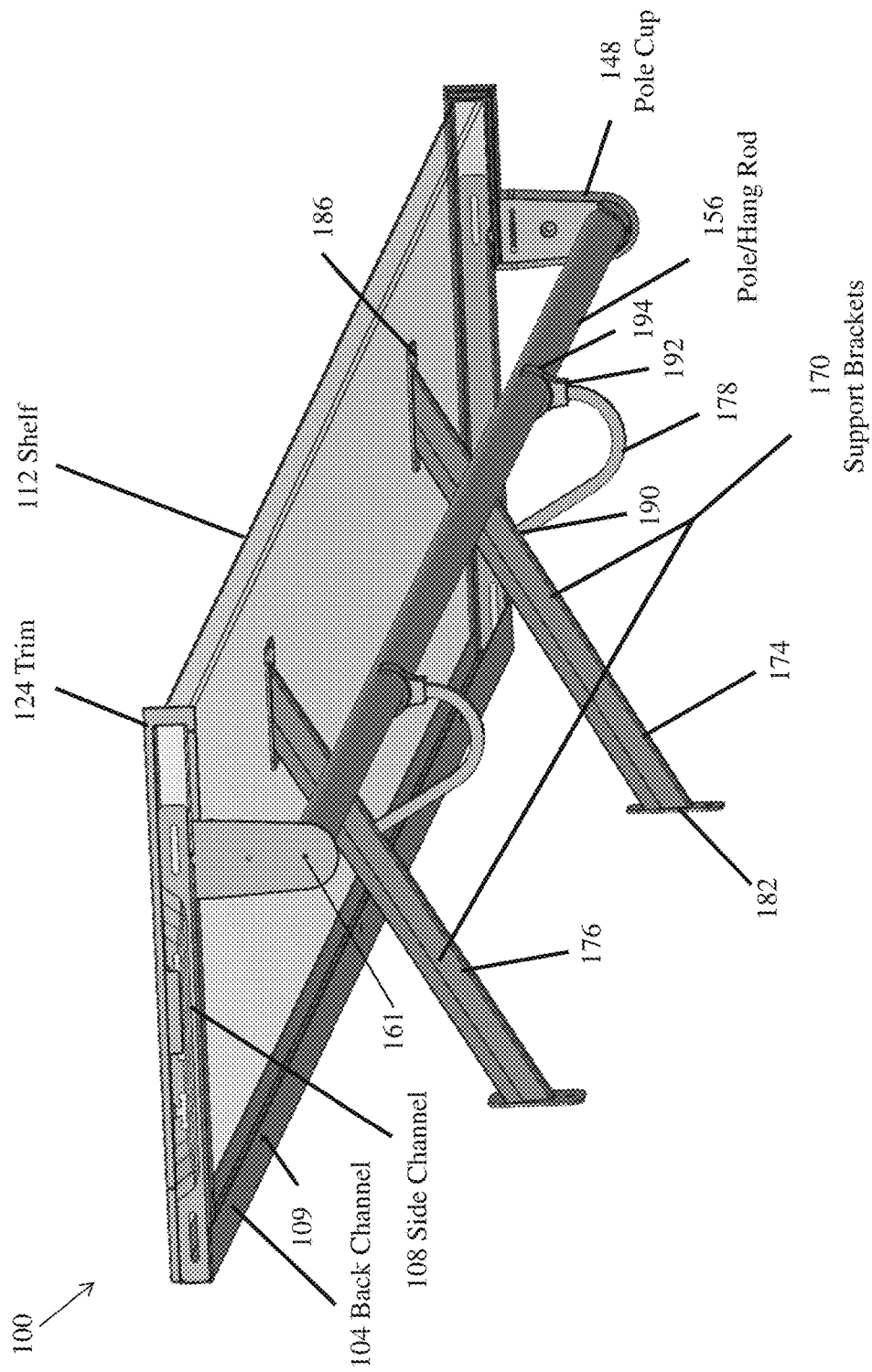
FIG. 1 is a perspective view of an exemplary embodiment of a storage system that includes a back channel (broadly, a back support member), a pair of opposing side channels or brackets (broadly, side support members), a pair of opposing trim pieces each coupled to one of the side brackets, a shelf supported by the back channel, side brackets, and trim pieces, a pair of opposing pole cups each coupled to one of the trim pieces and one of the side brackets, a pair of support brackets coupled to an underside of the shelf, and a hang rod or pole supported below the shelf.

With reference to FIG. 1, there is shown an exemplary embodiment of a storage system 100 embodying one or more aspects of the present disclosure. As shown, the storage system 100 generally includes a back channel 104 (broadly, a back support member) and first and second side brackets, channels, or cleats 108 (broadly, side support members).

Figure 2:
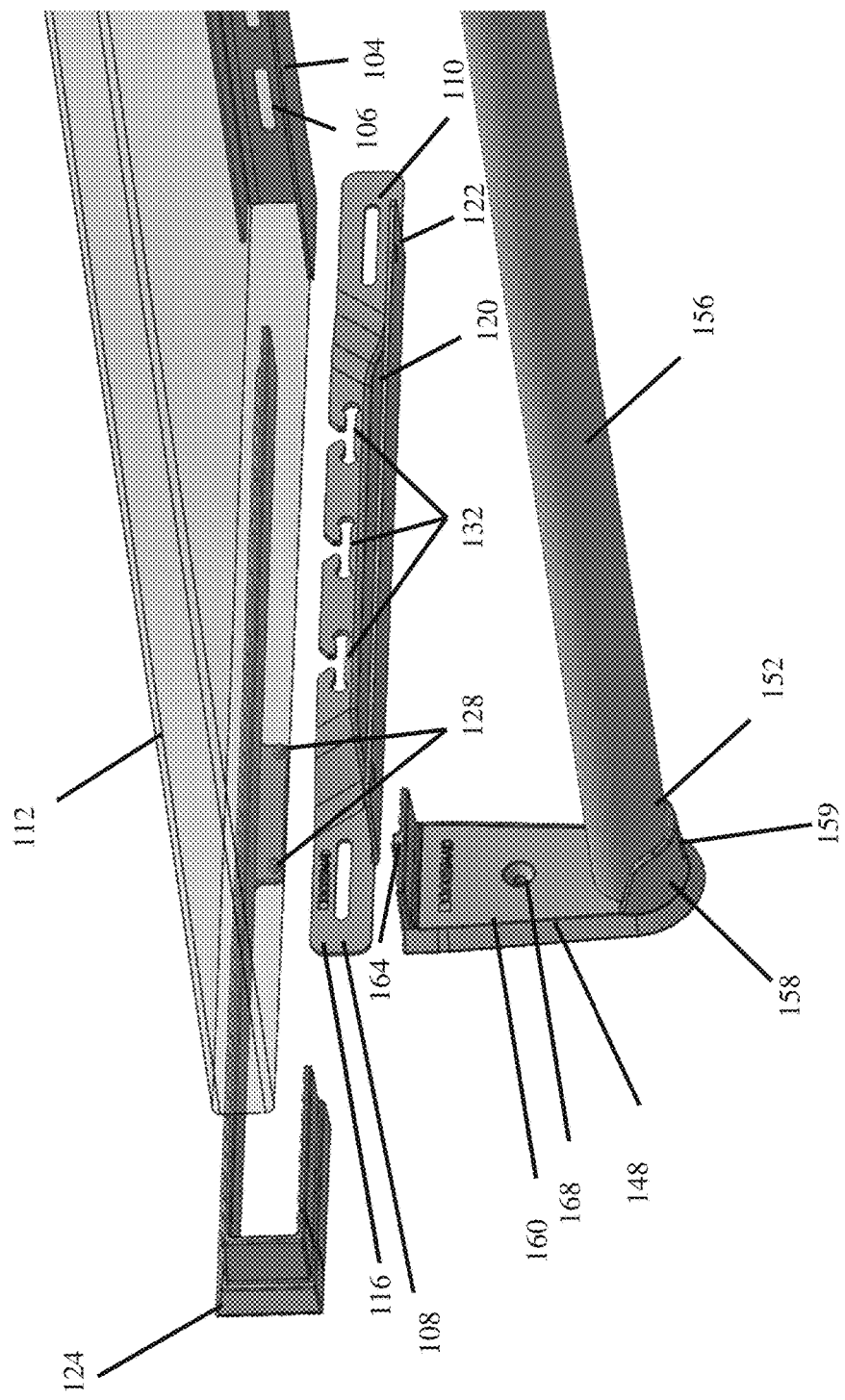
FIG. 2 is an exploded perspective view of a portion of the storage system shown in FIG. 1.

The back channel 104 is configured to be mountable (e.g., mechanically fastened, etc.) along a back wall of a closet, etc. The first and second side channels or brackets 108 are configured to be mountable (e.g., mechanically fastened, etc.) along opposing first and second sidewalls of the closet. As shown in FIG. 2, the back channel 104 includes openings 106 (e.g., elongate oval shaped openings, etc.) for receiving mechanical fasteners (e.g., drywall anchors, etc.) therethrough. The side brackets 108 also includes openings 110 (e.g., elongate oval shaped openings, etc.) for receiving mechanical fasteners (e.g., drywall anchors, etc.) therethrough.

Figure 3:
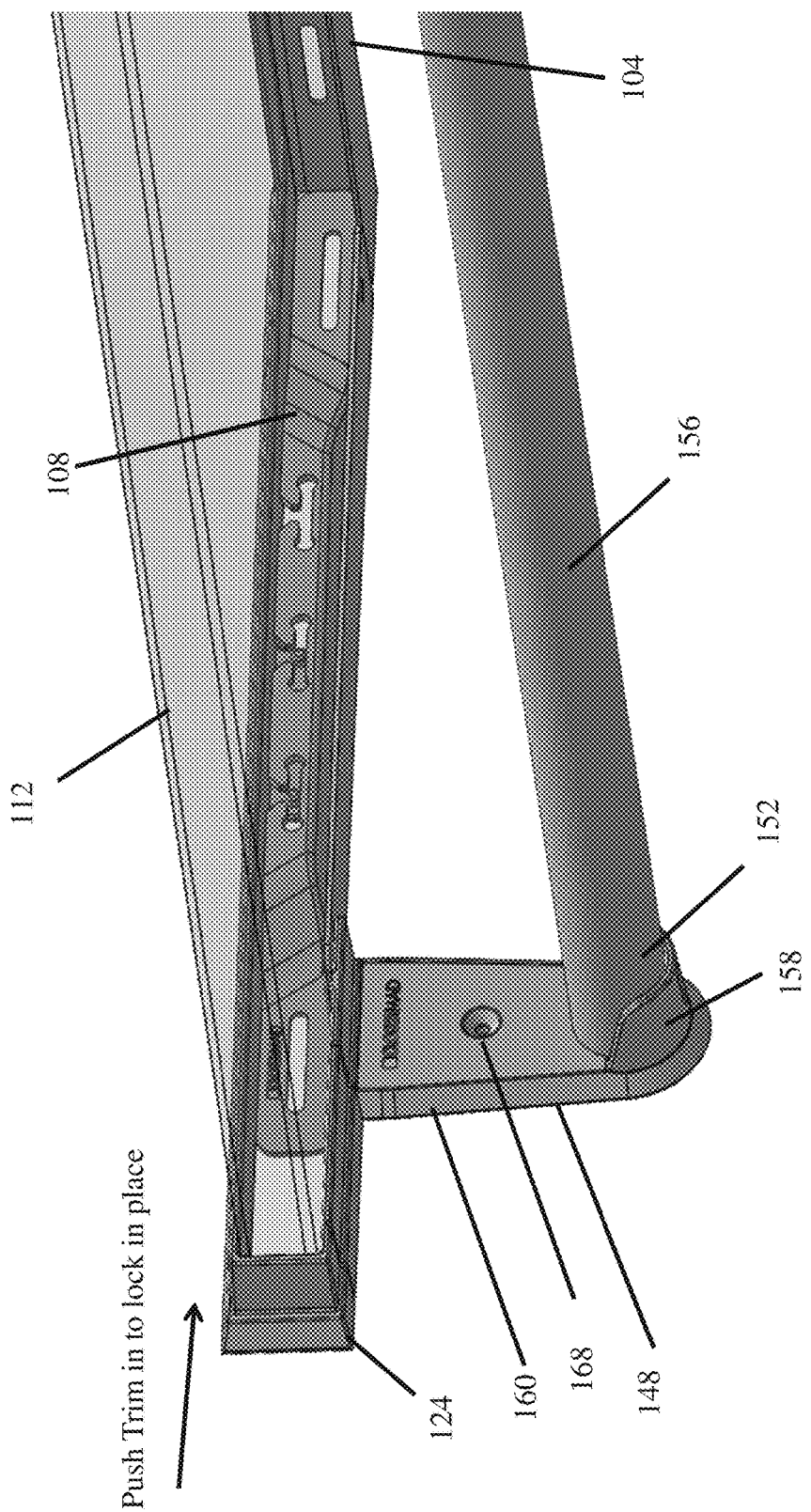
FIG. 3 is a perspective of the portion of the storage system shown in FIG. 2 after being assembled together.

The back channel 104 includes opposing upper and lower walls or surfaces and a back wall or surface generally perpendicular to the opposing upper and lower walls. The back wall and the opposing upper and lower walls cooperatively define a C-shaped or U-shaped profile such that the back channel 104 is configured (e.g., sized, shaped, located, etc.) for receiving a back portion of a shelf 112 therein, as shown in FIGS. 2 and 3. The back channel 104 includes openings 109 (e.g., circular holes, etc.) along the bottom wall as shown in FIG. 1. The openings 109 may be configured for receiving mechanical fasteners (e.g., screws, nails, etc.) therethrough for mechanically fastening the back channel 104 to the underside of the shelf 112.

Each side channel or bracket 108 (e.g., L-bracket, etc.) includes a first or vertical portion 116 that includes the openings 110. Each side channel or bracket 108 also includes a second portion or shelf support surface 120 that extends generally perpendicular and horizontally outward from the vertical portion 116. The shelf support surface 120 is configured (e.g., sized, shaped, located, etc.) for receiving a side edge portion of the shelf 112 thereon, as shown in FIGS. 2 and 3. The shelf support surface 120 includes openings 122 (e.g., circular holes, etc.) for receiving mechanical fasteners (e.g., screws, nails, etc.) therethrough for mechanically fastening the side channel 108 to the underside of the shelf 112.

When the back channel 104 and side channels or brackets 108 are respectively mounted along a closet's back wall and sidewalls, the shelf 112 may be supported by the back channel 104 and side brackets 108. As shown in FIGS. 2 and 3, the shelf 112 may be positioned relative to the back channel 104 and side brackets 108 such that the shelf's back portion is positioned within the back channel 104 and such that the shelf's opposing right and left side edge portions are positioned atop the shelf support surfaces 120 of the respective right and left side brackets or channels 108.

Figure 4:
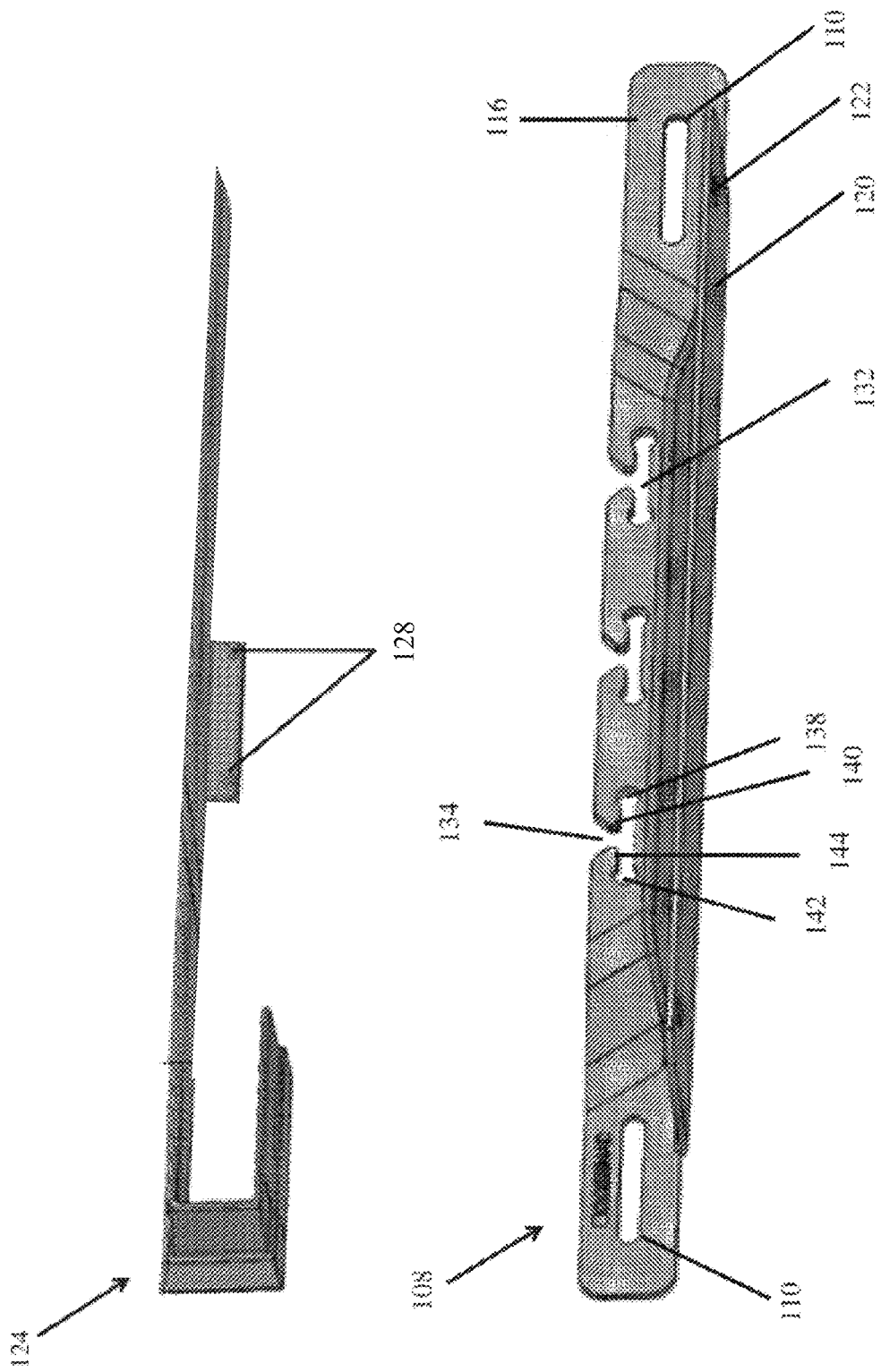
FIG. 4 includes perspective views of a side channel or bracket and a trim piece shown in FIG. 2.

The storage system 100 further includes first and second pieces of trim 124 that may be respectively coupled to the first and second side channels 108. As shown in FIGS. 2 and 4, the trim 124 includes first and second (or front and back) spaced apart protrusions or protuberances 128 configured (e.g., sized, shaped, located, etc.) for engagement within different spaced apart openings 132 of the side channel 108.

In this exemplary embodiment, the side channel 108 includes three sets of openings 132 providing two different mounting locations for the trim 124 to the side channel 108. For example, FIG. 3 shows the trim 124 coupled to the side channel 108 in a first or forward mounting location with the trim's front and back protrusions 128 respectively positioned within the front and middle (or first and second) openings 132 to accommodate the width of the shelf 112.

If the shelf 112 is narrower, then the trim 124 may instead be coupled to the side channel 108 in a second or rearward mounting location with the trim's front and back protrusions 128 respectively positioned within the middle and back (or second and third) openings 132. The distance separating the front of the trim 124 to the back channel 104 is less for the second mounting location to thereby accommodate the narrower width of the shelf 112.

After the trim's front and back protrusions 128 has been positioned within two of the openings 132 of the side channel 108, the trim 124 may then be pushed and slid backwardly towards the back channel 104 to lock the trim 124 into place. The backward movement of the trim 124 moves the trim's front and back protrusions 128 backward within the openings 132 of the side channel 108 from the first portion or entry 134 (FIG. 4) into a back locking position within the back end 138 of the openings 132. In the back locking position, the trim's protrusions 128 are positioned and interlocked generally underneath an overhanging portion 140 of the side channel 108.

In an exemplary installation process, the pieces of trim 124 may be positioned relative to the side channels 108 to position each trim's front and back protrusions 128 within two of the openings 132 of the corresponding side channel 108. The pieces of trim 124 may then be pulled outwardly away from the back channel 104 to lock the pieces of trim 124 into place. The forward movement of each trim piece 124 slidably moves its front and back protrusions 128 forward within the openings 132 of the corresponding side channel 108 from the first portion or entry 134 (FIG. 4) into a front locking position within the front end 142 of the openings 132. In the front locking position, the trim's protrusions 128 are positioned and interlocked generally underneath an overhanging portion 144 of the side channel 108. With the protrusions 128 positioned in the front end 142 of the openings 132, the trim pieces 124 may thus be locked, retained or held in place in the front locking position such that the installer does not have to hold the trim pieces 124, thereby allowing the installer to pick up and position the shelf 112.

The installer may pick up and position the shelf 112 generally within the interior space or perimeter cooperatively defined by the back channel 104, side channels 108, and trim pieces 124. After the shelf 112 is in place, the trim pieces 124 may then be pushed and slid backwardly towards the back channel 104. The backward movement of each trim piece 124 slidably moves its front and back protrusions 128 backward within the openings 132 of the corresponding side channel 108 from the front end 142 to the back end 138 of the openings 132 into the back locking position in which the trim pieces 124 are retained to the corresponding side channels 108. Also in the back locking position, the shelf 112 is retained or supported by the back channel 104, side channels 108, and trim pieces 124 such that the installer does not have to hold the shelf 112. The installer may then mechanically fasten the respective left and right side channels 108 to the underside of the shelf 112 using fasteners (e.g., nails, screws, etc.) and the openings 122 along the bottom or shelf support surface 120 of the side channels 108.

As shown in FIG. 1, the system 100 further includes a pair of opposing end pole cups 148 (broadly, rod supports or end brackets) for supporting opposing end portions 152 of a hang rod or pole 156. As shown by FIGS. 2 and 3, the pole cups 148 are configured to be coupled generally between portions of the corresponding trim 124 and side channel 108. Each pole cup 148 includes a first or horizontal portion 158 and a second or vertical portion 160. The first portion 158 may generally comprise a U-shaped cradle or saddle portion for supporting the end portion 152 of the hang rod or pole 156 therein. The first portion 158 may extend generally perpendicular and outward from the second portion 160. The configuration (e.g., size, shape, location, etc.) of the U-shaped cradle or saddle portion may depend on the particular configuration (e.g., outer diameter, etc.) of the hang rod or pole 156. By way of example, the U-shaped cradle or saddle portion may be configured (e.g., sized, shaped, etc.) so that there is a tight fit (e.g., snap fit, friction fit, interference fit, etc.) between the U-shaped cradle or saddle and the end portion 152 of the hang rod or pole 156.

In some exemplary embodiments, the end portions 152 of the hang rod 156 may be coupled to the U-shaped cradle or saddle portions of the pole cups 148, e.g., via soldering, mechanical fasteners (e.g., screws, nails, etc.), etc. For example, the pole cup 148 includes an opening 159 (e.g., circular hole, etc.) in the bottom of the U-shaped cradle or saddle portion as shown in FIG. 2. The pole cup 148 also includes another opening 161 (e.g., circular hole, etc.) through the second portion 160 as shown in FIG. 1. Either or both openings 159 and 161 may be used for receiving a fastener (e.g., nail, screw, self-tapping screw, etc.) to mechanically fasten the end of the hang rod 156 to the pole cup 148. Alternatively, the end portions 152 of the hang rod 156 may simply rest within the U-shaped cradle or saddle portions of the pole cups 148 without being mechanically fastened, soldered, or otherwise affixed to the U-shaped cradle or saddle portions in other exemplary embodiments.

The second portion 160 includes a protrusion or projection 164 (e.g., T-shaped protrusion, etc.) extending upwardly along a top of the second portion 160. The protrusion 164 may be positioned between portions of the corresponding trim 124 and side channel 108. The protrusion 164 is configured to engage a cut-out, notch, or slot in the bottom surface or leg of the side channel 108, thus positioning the pole cup 148 in its final location in the Y-Z plane.

The second portion 160 of the pole cup 148 may also include an opening 168, such as a circular hole, etc. The opening 168 may be configured for receiving a mechanical fastener (e.g., screw, nail, etc.) therethrough for mechanically fastening the pole cup 148 to a side wall of a closet. Alternatively, the pole cup 148 may also be coupled to system 100 without using any mechanical fasteners in other exemplary embodiments.

The system 100 may also include one or more support brackets 170 for providing additional support for the shelf 112 and the hang rod or pole 156. In the illustrated embodiment of FIG. 1, the system 100 includes two support brackets 170 configured for supporting the shelf 112 and for supporting portions of the hang rod or pole 156 that are spaced apart from the hang rod's end portions 152. Alternatively, other exemplary embodiments may include a single support bracket 170, more than two support brackets 170, or no support brackets 170.

With continued reference to FIG. 1, each of the support brackets 170 includes a shelf support member 174 and a hang rod support member or hook 178. The shelf support member 174 includes first and second end portions 182 and 186 configured to be respectively coupled to a back wall of a closet, etc., and to an underside of the shelf 112. In this exemplary embodiment, the first and second end portions 182 and 186 include openings (e.g., circular holes, etc.) for receiving mechanical fasteners (e.g., screws, nails, etc.) therethrough for mechanically fastening the first and second end portions 182, 186 to the wall and shelf underside.

Figure 5:
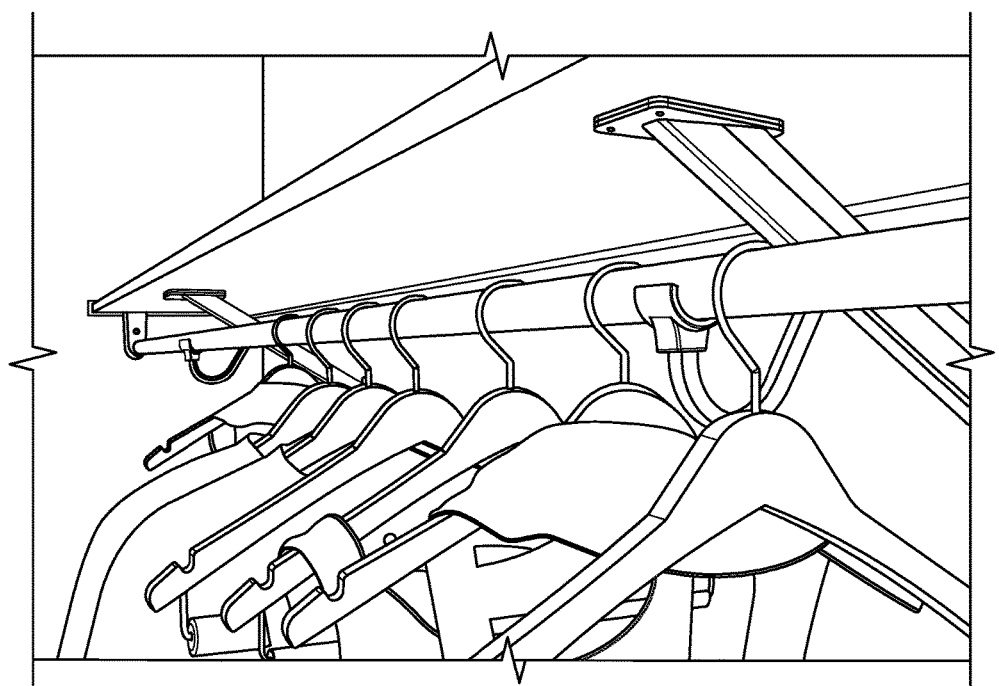
FIG. 5 shows the storage system shown in FIG. 1 mounted within a closet and in use with clothes hangers positioned along the pole or hang rod, which is suspended or supported beneath the shelf by the pole cups and support brackets according to an exemplary embodiment.

The shelf support member 174 may comprise a generally rigid linear brace 176 that extends diagonally between the shelf 112 and the back wall of the closet when the shelf support member 174 is coupled or mounted to the closet's back wall and underside of the shelf 112 (e.g., FIGS. 1 and 5, etc.). Alternatively, the shelf support member 174 may be configured differently (e.g., non-linear, curved, etc.) in other exemplary embodiments.

The hang rod support member 178 includes first and second end portions 190 and 192. The first end portion 190 is configured to be coupled to the shelf support member 174. In this exemplary embodiment, the first end portion 190 include openings (e.g., circular holes, etc.) for receiving mechanical fasteners (e.g., screws, nails, etc.) therethrough for mechanically fastening the first end portion 190 to the shelf support member 174. Alternatively, the hang rod support member 178 may be configured differently in other exemplary embodiments. For example, the hang rod support member 178 may be an integral portion of the shelf support member 174 without any mechanical fasteners coupling between the hang rod support member 178 and the shelf support member 174. Or, for example, the first end portion 190 of the hang rod support member 178 may be welded, bonded, or otherwise affixed to the shelf support member 174 without using mechanical fasteners.

The second end portion 192 of the hang rod support member 178 is configured to receive a portion of the hang rod 156 therein. In this exemplary embodiment, the second end portion 192 includes a hang rod saddle or cradle portion 194 that is generally U-shaped and/or shaped to match or correspond to the outer diameter of the hang rod 156. The hang rod 156 may be positioned within and supported atop the cradle or saddle portion 194 of the hang rod support member 178. The hang rod saddle or cradle portion 194 may be configured (e.g., sized, shaped, etc.) so that there is a tight fit (e.g., snap fit, friction fit, interference fit, etc.) between the U-shaped cradle or saddle portion 194 and the hang rod or pole 156 when the hang rod or pole 156 is engaged with and resting within the U-shaped cradle or saddle portion 194. Alternatively, the hang rod or pole 156 may be mechanically fastened, soldered, or otherwise affixed to the U-shaped cradle or saddle portions in other exemplary embodiments.

The cradle or saddle portion 194 may include a slot configured (e.g., sized, shaped, located, etc.) to receive therein the second end portion 192 of the hang rod support member 178. When the second end portion 192 is inserted within the slot, the cradle or saddle portion 194 may be retained to the second end portion 192 solely by a friction or interference fit created therebetween. Alternatively, the hang rod support member 178 may be configured differently in other exemplary embodiments. For example, the saddle or cradle portion 194 may be an integral portion of the hang rod support member 178, e.g., without any slot in the saddle or cradle portion 194, without any a friction or interference fit created therebetween, etc. Or, for example, the saddle or cradle portion 194 may be coupled to the second end portion 192 of the hang rod support member 178 by welding, bonding, mechanical fastening, etc.

Because the end portions 152 and middle portions of the hang rod 156 are supported from below by the respective pole cups 148 and support brackets 170, the pole cups 148 and support brackets 170 do not interfere with the sliding movement of clothes hangers along the hang rod 156. Accordingly, clothes hangers are able to freely slide along the entire length (or almost the entire length) of the hang rod 156 without interference from the pole cups 148 and support brackets 170.

Figure 6:
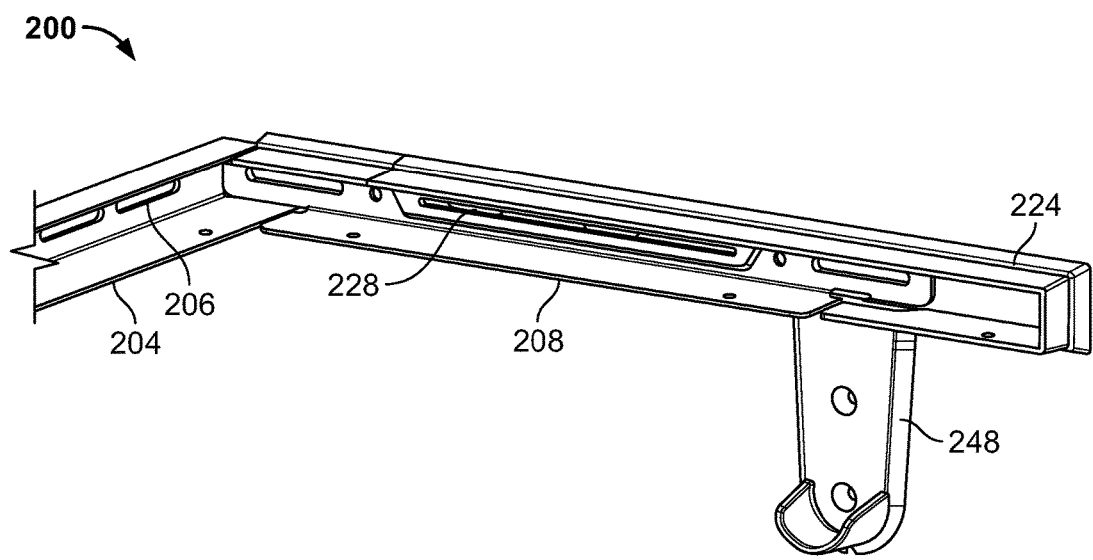
FIG. 6 is a perspective view of a portion of another exemplary embodiment of a storage system and showing a back channel (broadly, a back support member), a side channel or bracket (broadly, a side support member) coupled to the back channel, a trim piece coupled to the side bracket, and a pole cup coupled to and/or between the trim piece and the side bracket.
Figure 8A:
FIGS. 8A and 8B are front views of two alternative back channels that may be used with the storage system shown in FIG. 7 in exemplary embodiments, wherein the back channels include openings having different configurations for mounting the back channels to a back closet wall.
Figure 8B:
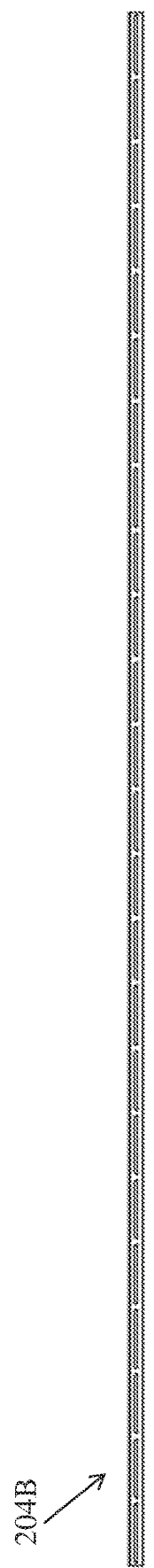
Figure 22:
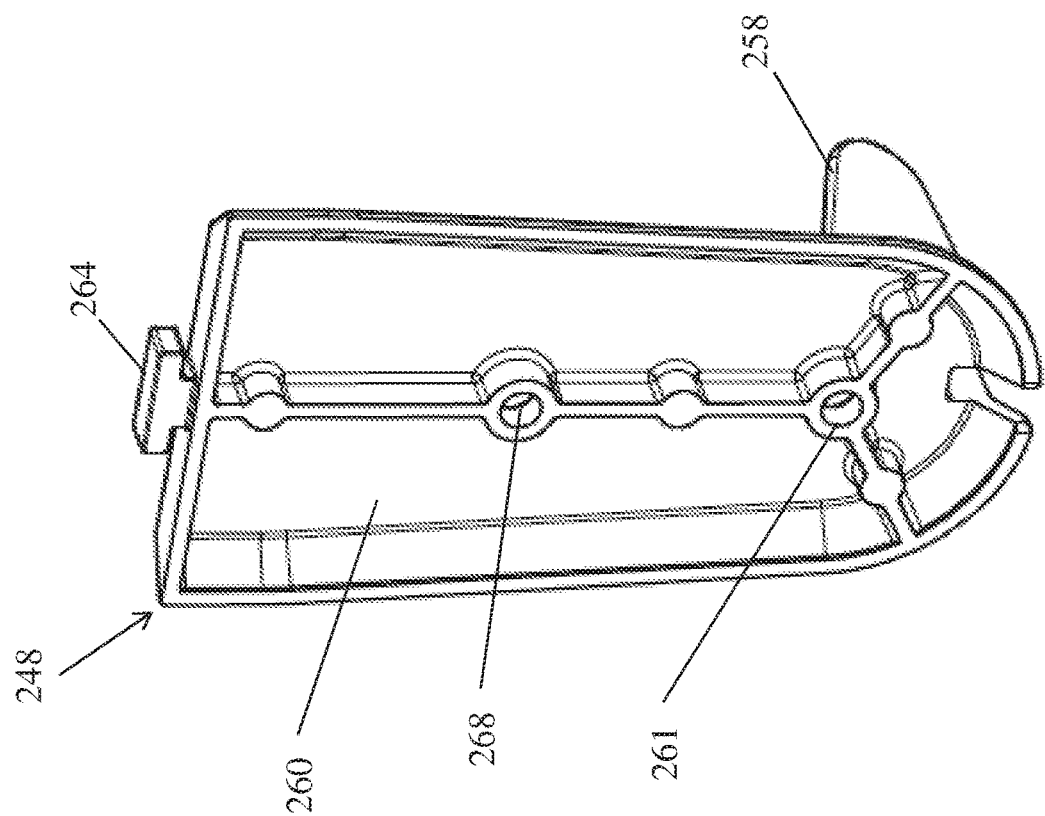
FIGS. 21 and 22 are front and back perspective views, respectively, of an end pole cup that may be used for supporting an end portion of a hang rod in the storage system shown in FIG. 7 in exemplary embodiments.
Figure 21:
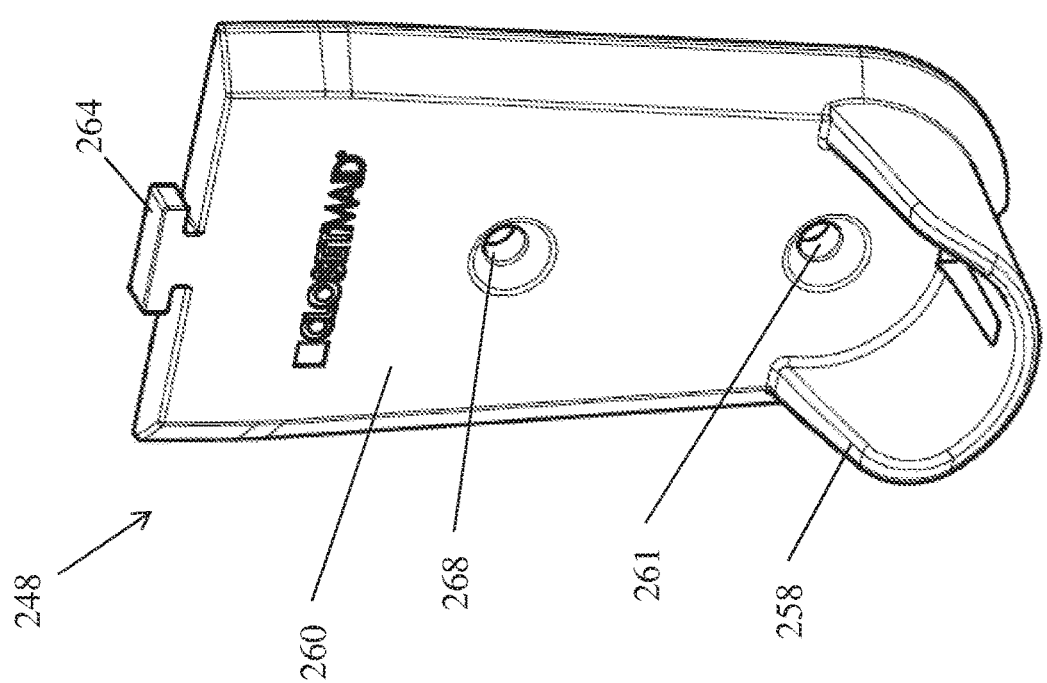

FIG. 6 illustrates another exemplary embodiment of a storage system 200 embodying one or more aspects of the present disclosure. The storage system 200 generally includes a back channel 204 (FIGS. 6, 8A, and 8B), side channels 208 (FIGS. 6, 9A, and 9B), shelf trim pieces 224 (e.g., FIGS. 6, 10A, and 10B), end pole cups 248 (FIGS. 6, 21, and 22), a pole or hang rod (e.g., 156 shown in FIG. 1, etc.), support brackets 270 (FIGS. 6 and 11-20) and a shelf (e.g., 112 shown in FIG. 1, etc.).

When the system 200 is fully assembled, the back channel 204 and side channels 208 may be respectively mounted to a back wall and side walls of a closet. A pair of opposing trim pieces 224 may each be coupled to one of the side channels 208. The shelf may be supported generally between and/or by the back channel 204, side channels 208, and trim pieces 224. A pair of opposing pole cups 248 may each be coupled to and/or between a corresponding one of the trim pieces 224 and one of the side channels 208. One or more support brackets 270 may be coupled to an underside of the shelf and to the back wall of the closet. A hang rod or pole may be supported by the end pole cups 248 and the cradle portion 294 of the support brackets 270 such that the hang rod or pole is generally below or beneath the shelf.

The back channel 204 is configured to be mountable (e.g., mechanically fastened, etc.) along a back wall of a closet, etc. As shown in FIG. 6, the back channel 204 includes openings 206 (e.g., elongate oval shaped openings, etc.) for receiving mechanical fasteners (e.g., drywall anchors, etc.) therethrough. FIGS. 8A and 8B are front views of two alternative back channels 204A and 204B that may be used with the storage system 200 shown in FIG. 7. As shown by a comparison of FIGS. 8A and 8B, the back channel 204A (FIG. 8A) includes smaller and more elongate oval shaped openings than the back channel 204B (FIG. 8B).

Figure 7:
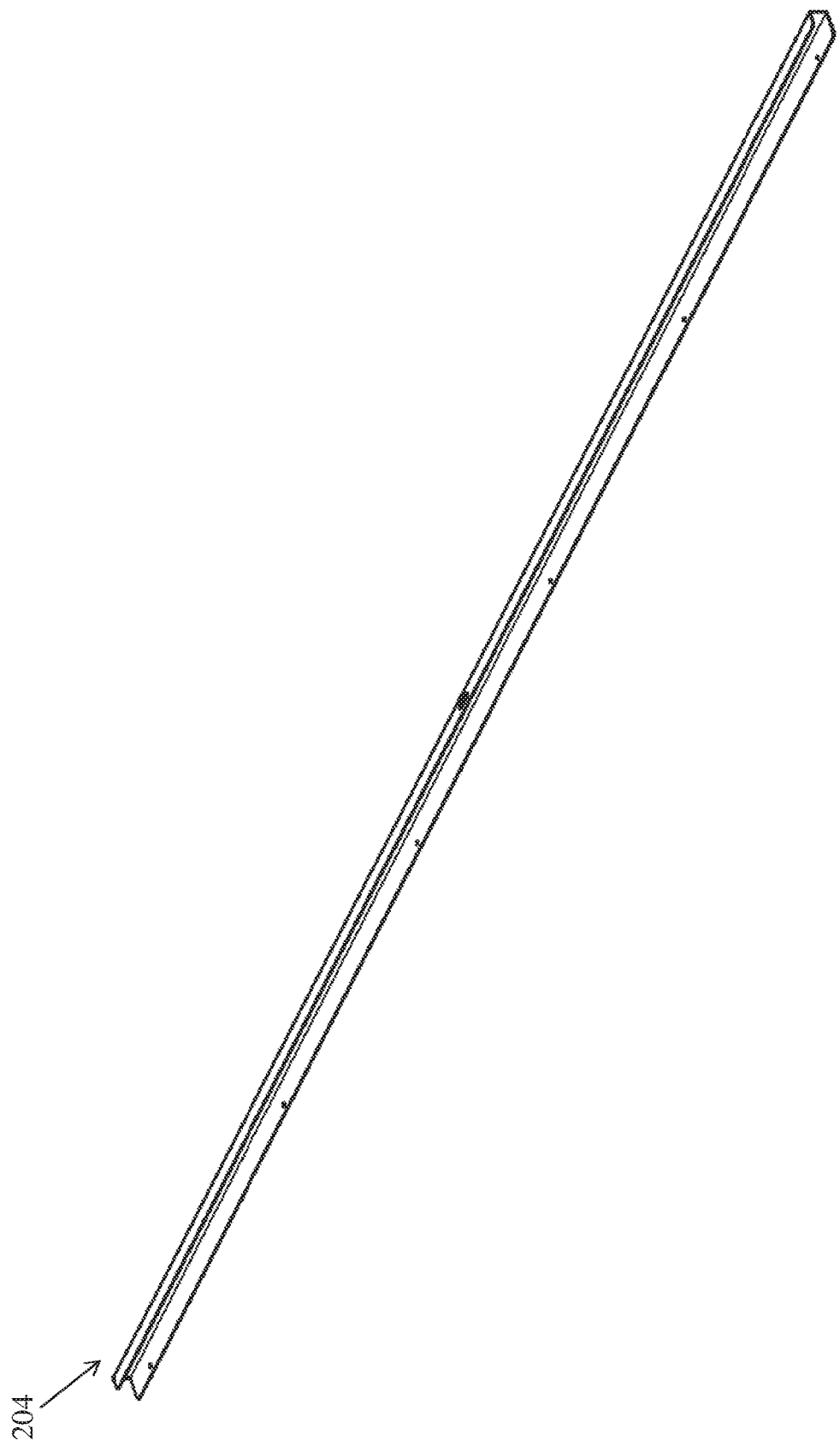
FIG. 7 is a perspective view of the back channel shown in FIG. 6.

As shown in FIG. 7, the back channel 204 includes upper and lower opposing walls or surfaces and a back wall or surface generally perpendicular to the upper and lower opposing walls. The back wall and the opposing upper and lower walls generally define a U-shaped channel configured (e.g., sized, shaped, located, etc.) for receiving a back portion of a shelf therein. The back channel 204 includes openings (e.g., circular holes, etc.) along the bottom wall. The openings may be configured for receiving mechanical fasteners (e.g., screws, nails, etc.) therethrough for mechanically fastening the bottom wall of the back channel 204 to the underside of the shelf.

The first and second side channels 208 are configured to be mountable (e.g., mechanically fastened, etc.) along opposing first and second sidewalls of the closet. Each side channel 208 include a vertical portion 216 (FIG. 9A) having openings 210 (e.g., circular holes, elongate oval shaped openings, etc.) for receiving mechanical fasteners (e.g., drywall anchors, etc.) therethrough to mount the side channel 208 to a wall or other support surface.

Each side channel 208 also includes a shelf support surface 220 (FIG. 9A) that extends generally perpendicular and horizontally outward from the vertical portion 216. The shelf support surface 220 and vertical portion 216 cooperatively define an L-shaped profile for the side channel 208 (e.g., an L-shaped bracket, etc.). The shelf support surface 220 is configured (e.g., sized, shaped, located, etc.) for receiving a side edge portion of the shelf. The shelf support surface 220 includes openings 222 (e.g., circular holes, etc.) for receiving mechanical fasteners (e.g., screws, nails, etc.) therethrough for mechanically fastening the side channel 208 to the underside of the shelf.

When the back channel 204 and side channels 208 are respectively mounted along a closet's back wall and sidewalls, a shelf may be supported by the back channel 204 and side channels 208. The shelf may be positioned relative to the back channel 204 and side channels 208 such that the shelf's back portion is positioned within the back channel 204 and such that the shelf's opposing right and left side edge portions are positioned atop the shelf support surfaces 220 of the respective right and left side channels 208.

The storage system 200 further includes first and second pieces of trim 224 (FIGS. 6, 10A, and 10B) that may be respectively coupled (e.g., mechanically fastened, etc.) to the first and second side channels 208. By way of example, the trim 224 may include first and second (or front and back) spaced apart protrusions or protuberances 228 (FIG. 6) that are configured (e.g., sized, shaped, located, etc.) for engagement within one or more openings 232 (FIG. 9A) of the side channel 208.

The protuberances 228 may be defined by or included on interior surfaces of the outwardly extending tabs 229A (FIG. 10A). As shown in FIG. 10A, the shelf trim piece 224A may also include an opening 226A configured for receiving a mechanical fastener (e.g., screw, nail, etc.) therethrough for mechanically fastening the trim 224A to the underside of a shelf.

FIG. 10B illustrates an alternative pair of shelf trim pieces 224B that includes openings 226B and 230B. The opening 226B is configured for receiving a mechanical fastener (e.g., screw, nail, etc.) therethrough for mechanically fastening the trim 224B to the underside of a shelf. The opening 230B is configured for receiving a mechanical fastener (e.g., screw, nail, etc.) therethrough for mechanically fastening the trim 224B to the topside of a shelf.

Figure 9A:
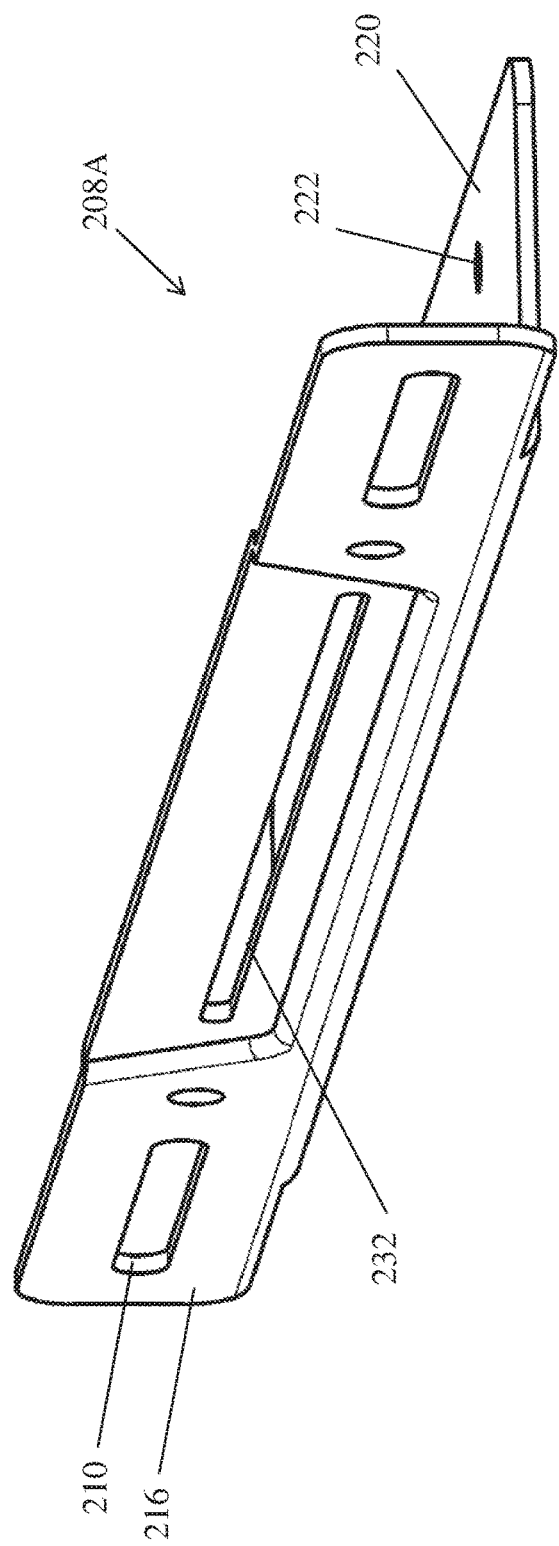
FIGS. 9A and 9B are perspective views of two alternative side channels or brackets that may be used with the storage system shown in FIG. 7 in exemplary embodiments.
Figure 9B:
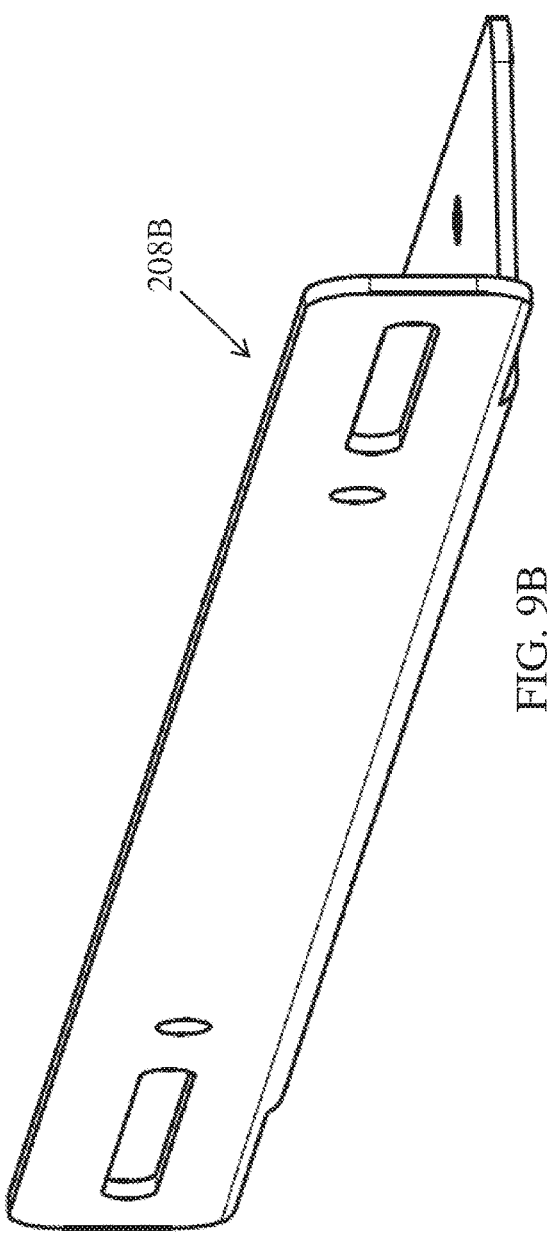
Figure 20:
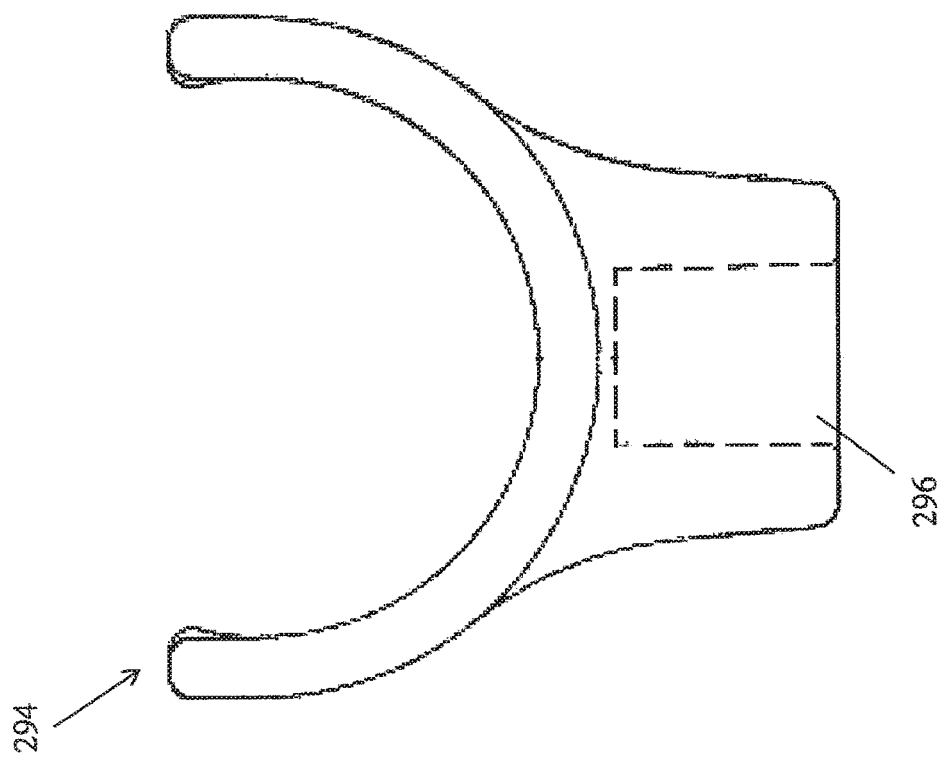
FIGS. 19 and 20 are perspective and side views, respectively, of the pole cup shown in FIG. 17.
Figure 19:
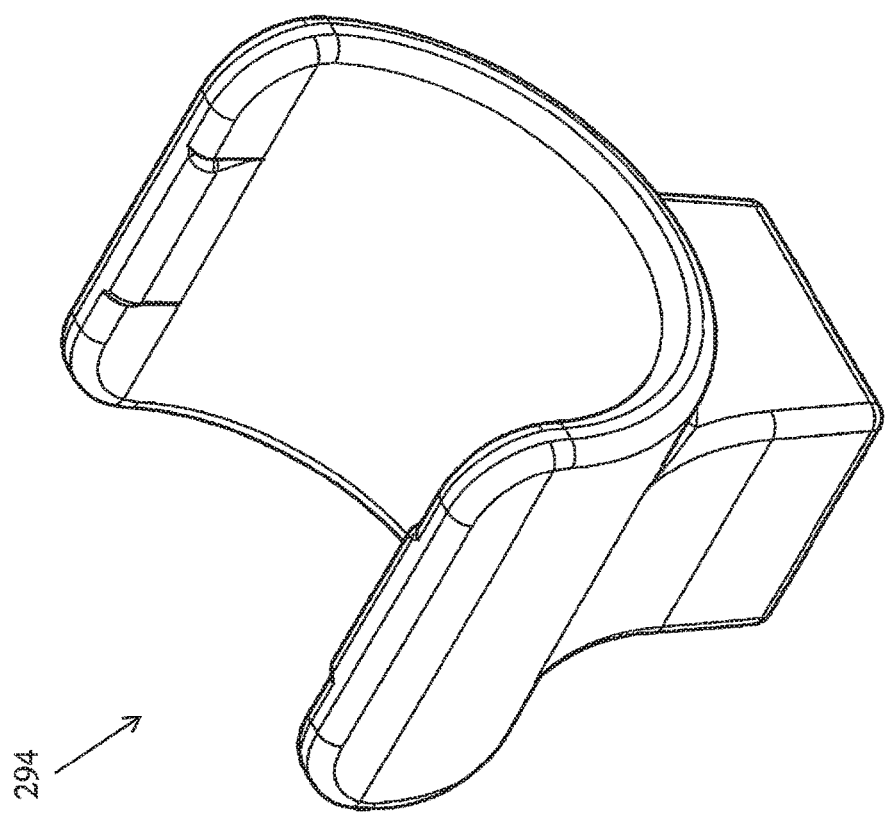

With continued reference to FIGS. 6 and 9A, the trim's front and back protrusions 228 may be positioned within the opening 232 of the side channel 208. The trim piece 224 may then be pushed or pulled so as to slide the protrusions 228 backwardly or forwardly along the opening 232, thereby adjusting the positioning of the trim piece 224 relative to the side channel 208.

In an exemplary installation process, the pieces of trim 224 may be positioned relative to the side channels 208 to position each trim's front and back protrusions 228 within the opening 232 of the corresponding side channel 208. The pieces of trim 224 may then be pulled outwardly away from the back channel 204 to slidably move the front and back protrusions 228 forward within the opening 232 of the corresponding side channel 208. With the protrusions 228 positioned in the front or forward position, a shelf may then be positioned generally within the interior space or perimeter cooperatively defined by the back channel 204, side channels 208, and trim pieces 224. After the shelf is in place, the trim pieces 224 may then be pushed and slid backwardly towards the back channel 204. The backward movement of each trim piece 224 slidably moves its front and back protrusions 228 backward within the opening 232 of the corresponding side channel 208 into the back or rearward position. The back channel 204 and the side channels 208 may then be mechanically fastened to the underside of the shelf using fasteners (e.g., nails, screws, etc.). The protrusions 228 of the trim pieces 224 and the elongate oval-shaped openings 232 of the side channels 208 may be configured such that engagement of the protrusions 228 within the openings 232 holds the trim pieces 224 in place. This may allow an installer to pick up and position the shelf without having to hold the trim pieces 224.

The system 200 further includes a pair of opposing end pole cups 248 (broadly, rod supports or end brackets) for supporting opposing end portions of a hang rod or pole. As shown in FIG. 6, the end pole cups 248 are configured to be coupled generally between portions of the corresponding trim 224 and side channel 208. Each pole cup 248 (FIGS. 21 and 22) includes a first or horizontal portion 258 and a second or vertical portion 260. The first portion 258 may generally comprise a U-shaped cradle or saddle portion for supporting the end portion of a hang rod or pole therein. The first portion 258 may extend generally perpendicular and outward from the second portion 260. The configuration (e.g., size, shape, location, etc.) of the U-shaped cradle or saddle portion may depend on the particular configuration (e.g., outer diameter, etc.) of the hang rod or pole. By way of example, the U-shaped cradle or saddle portion may be configured (e.g., sized, shaped, etc.) so that there is a tight fit (e.g., snap fit, friction fit, interference fit, etc.) between the U-shaped cradle or saddle and the end portion of the hang rod or pole.

In some exemplary embodiments, the end portions of the hang rod may be coupled to the U-shaped cradle or saddle portions of the pole cups 248, e.g., via soldering, mechanical fasteners (e.g., screws, nails, etc.), etc. The pole cup 248 includes an openings 261 (e.g., circular hole, etc.) through the second portion 160. The opening 261 may be used for receiving a fastener (e.g., nail, screw, self-tapping screw, etc.) to mechanically fasten the end of the hang rod to the pole cup 248. Alternatively, the end portions of the hang rod may simply rest within the U-shaped cradle or saddle portions of the pole cups 248 without being mechanically fastened, soldered, or otherwise affixed to the U-shaped cradle or saddle portions in other exemplary embodiments.

The second portion 260 includes a protrusion or projection 264 (e.g., T-shaped protrusion, etc.) extending upwardly along a top of the second portion 260. As shown in FIG. 6, the protrusion 264 may be positioned between portions of the corresponding trim 224 and side channel 208. The protrusion 264 is configured to engage a cut-out, notch, or slot in the bottom surface or leg of the side channel 208, thus positioning the pole cup 248 in its final location in the Y-Z plane.

The second portion 260 of the pole cup 248 may also include an opening 268, such as a circular hole, etc. The opening 268 may be configured for receiving a mechanical fastener (e.g., screw, nail, etc.) therethrough for mechanically fastening the pole cup 248 to a side wall of a closet. Alternatively, the pole cup 248 may also be coupled to system 200 without using any mechanical fasteners in other exemplary embodiments.

The system 200 may also include one or more support brackets 270 (FIGS. 11 through 18) for providing additional support for a shelf and the hang rod or pole. The system 200 includes two support brackets 270 configured for supporting a shelf and for supporting portions of a hang rod or pole that are spaced apart from the hang rod's end portions. Alternatively, other exemplary embodiments may include a single support bracket 270, more than two support brackets 270, or no support brackets 270.

As shown in FIGS. 17 and 18, the support bracket 270 includes a shelf support member 274 and a hang rod support member or hook 278. The shelf support member 274 includes first and second end portions 282 and 286 configured to be respectively coupled to a back wall of a closet, etc. and to an underside of a shelf. In this exemplary embodiment, the first and second end portions 282 and 286 include openings (e.g., circular holes, etc.) for receiving mechanical fasteners (e.g., screws, nails, etc.) therethrough for mechanically fastening the first and second end portions 282, 286 to the wall and shelf underside.

The shelf support member 274 may comprise a generally rigid linear brace configured to extend diagonally between a shelf and a back wall of the closet when the shelf support member 274 is coupled or mounted to the closet's back wall and underside of the shelf. Alternatively, the shelf support member 274 may be configured differently (e.g., non-linear, curved, etc.) in other exemplary embodiments.

The hang rod support member or hook 278 includes first and second end portions 290 and 292. The first end portion 290 is configured to be respectively coupled to the shelf support member 274. In this exemplary embodiment, the first end portion 290 includes a hook shaped portion configured to be received through an opening in the shelf support member 274 and then coupled with (e.g., hooked onto, soldered to, etc.) the shelf support member 274. Alternatively, the hang rod support member 278 may be configured differently in other exemplary embodiments. For example, the hang rod support member 278 may be an integral portion of the shelf support member 274 without any mechanical fasteners coupling between the hang rod support member 278 and the shelf support member 274. Or, for example, the first end portion 290 of the hang rod support member 278 may be welded, bonded, or otherwise affixed to the shelf support member 274 without using mechanical fasteners.

The second end portion 292 (FIG. 14) of the hang rod support member or hook 278 is configured to receive a hang rod saddle or cradle portion 294 (FIGS. 17-20). The saddle or cradle portion 294 is generally U-shaped and/or shaped to match or correspond to the outer diameter of the hang rod or pole. The hang rod may be positioned within and supported atop the cradle or saddle portion 294. The hang rod saddle or cradle portion 294 may be configured (e.g., sized, shaped, etc.) so that there is a tight fit (e.g., snap fit, friction fit, interference fit, etc.) between the U-shaped cradle or saddle portion 294 and the hang rod or pole when the hang rod or pole is engaged with and resting within the U-shaped cradle or saddle portion 294. Alternatively, the hang rod or pole may be mechanically fastened, soldered, or otherwise affixed to the U-shaped cradle or saddle portions in other exemplary embodiments.

The hang rod saddle or cradle portion 294 includes an opening 296 (FIGS. 19 and 20) along the bottom. The opening 296 is configured (e.g., sized, shaped, etc.) to receive the second end portion 292 of the hang rod support member or hook 278 therein such that there is a tight fit (e.g., snap fit, friction fit, interference fit, without mechanical fasteners, etc.) between the U-shaped cradle or saddle portion 294 and the second end portion 292. When the second end portion 292 is inserted within the opening 296, the cradle or saddle portion 294 may be retained to the second end portion 292 solely by a friction or interference fit created therebetween. Alternatively, the hang rod support member 278 may be configured differently in other exemplary embodiments. For example, the saddle or cradle portion 294 may be an integral portion of the hang rod support member 278, e.g., without any opening in the saddle or cradle portion 294, without any a friction or interference fit created therebetween, etc. Or, for example, the saddle or cradle portion 294 may be coupled to the second end portion 292 of the hang rod support member 278 by welding, bonding, mechanical fastening, etc.

Because the end portions and middle portions of the hang rod are supported from below by the respective end pole cups 248 and support brackets 270, the end pole cups 248 and support brackets 270 do not interfere with the sliding movement of clothes hangers along the hang rod. Accordingly, clothes hangers are able to freely slide along the entire length (or almost the entire length) of the hang rod without interference from the end pole cups 248 and support brackets 270.

A description will now be provided of an exemplary process for installing an exemplary embodiment of a storage system disclosed herein (e.g., storage system 100 shown in FIGS. 1 through 7, storage system 200 shown in FIGS. 6 through 22, etc.). In a first step, pilot holes may be drilled (e.g., according to a wire template for building division, etc.) in the walls of a closet at the mounting locations at which the back and side channels (e.g., 104 and 108 (FIG. 1), 204 and 208 (FIG. 6), etc.) will be mounted to the closet walls.

After the pilot holes are drilled, the back and side channels may then be mounted or mechanically fastened to the respective back wall and sidewalls of the closet. A shelf (e.g., 112 (FIG. 1), etc.) and trim pieces (e.g., 124 (FIG. 2), 224 (FIGS. 6, 10A, an 10B), etc.) may be slidably positioned relative to the back and side channels to couple left and right trim pieces to the respective left and right side channels, such that the shelf is supported generally between and/or by the back and side channels and trim pieces.

The bottom surface of the respective left and right side channels may be mechanically fastened to the underside of the shelf. One or more shelf support brackets may be mechanically fastened respectively to the back wall of the closet and to the underside of the shelf. A hang rod or pole may be positioned to be supported by the end pole cups and the pole cups of the support brackets.

Figure 23:
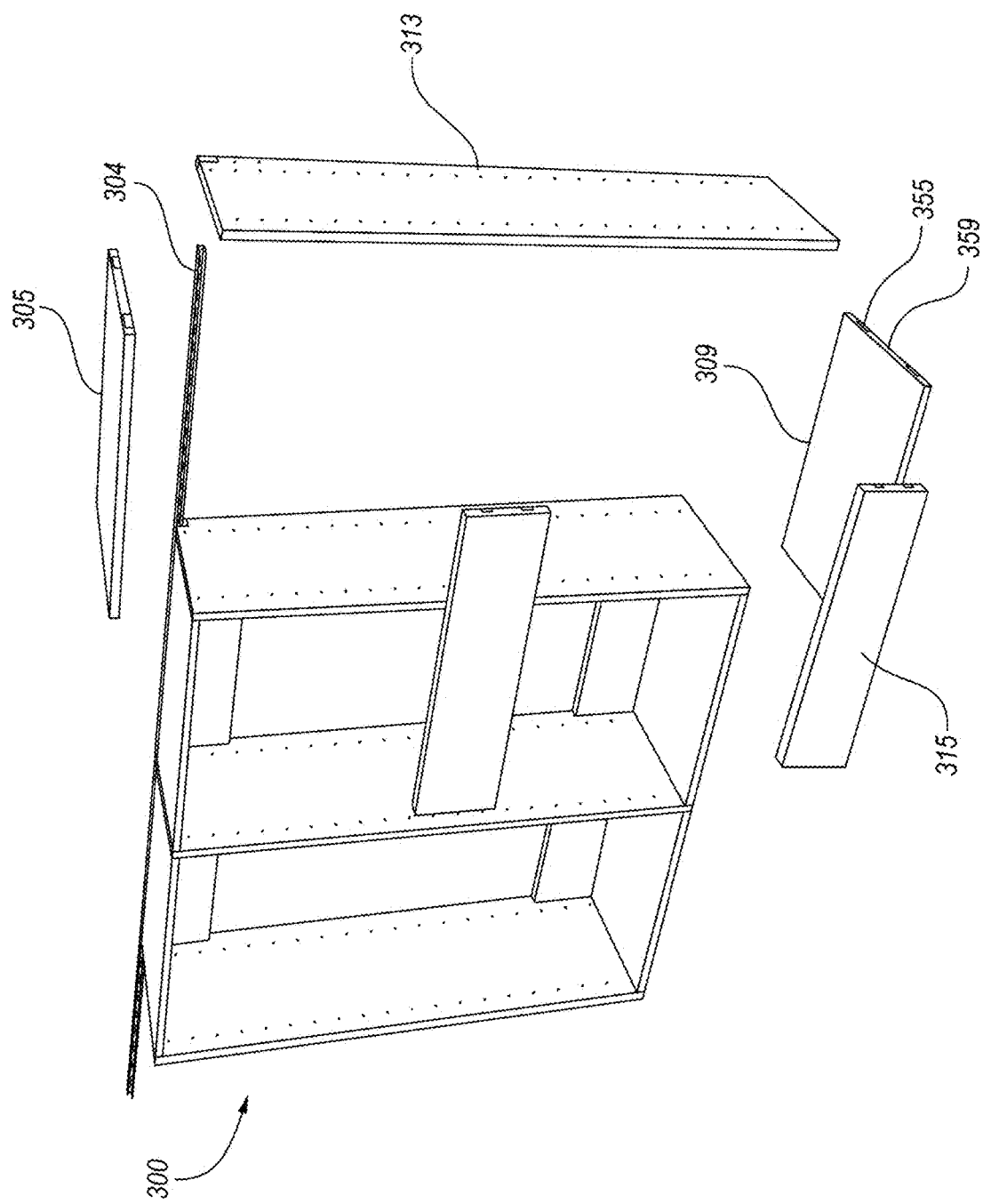
FIG. 23 is an exploded perspective view of an exemplary embodiment of a storage system that includes panels or walls (e.g., top, bottom, back, and side walls of a tower or cabinet, etc.) coupled to or engaged with (e.g., hanging from, suspended from, supported by, etc.) a back channel (broadly, a back support member).

FIG. 23 illustrates another exemplary embodiment of a storage system 300 embodying one or more aspects of the present disclosure. The storage system 300 generally includes a plurality of walls or panels and a back channel 304 (broadly, a back support member). In this exemplary embodiment, the walls include top or upper walls 305, bottom or lower walls 309, side walls 313, and back walls 315.

In this exemplary embodiment, the walls or panels and the back channel 304 are configured such that the walls or panels may be assembled in a modular way. For example, the side walls 313 may be added, installed, or assembled piece-by-piece onto the back channel 304, such that the side walls 313 are supported (e.g., suspended or hanging, etc.) from the back channel 304. The various walls or panels may be connected or hung together, e.g., in a linear series or daisy chain, etc.

Figure 24:
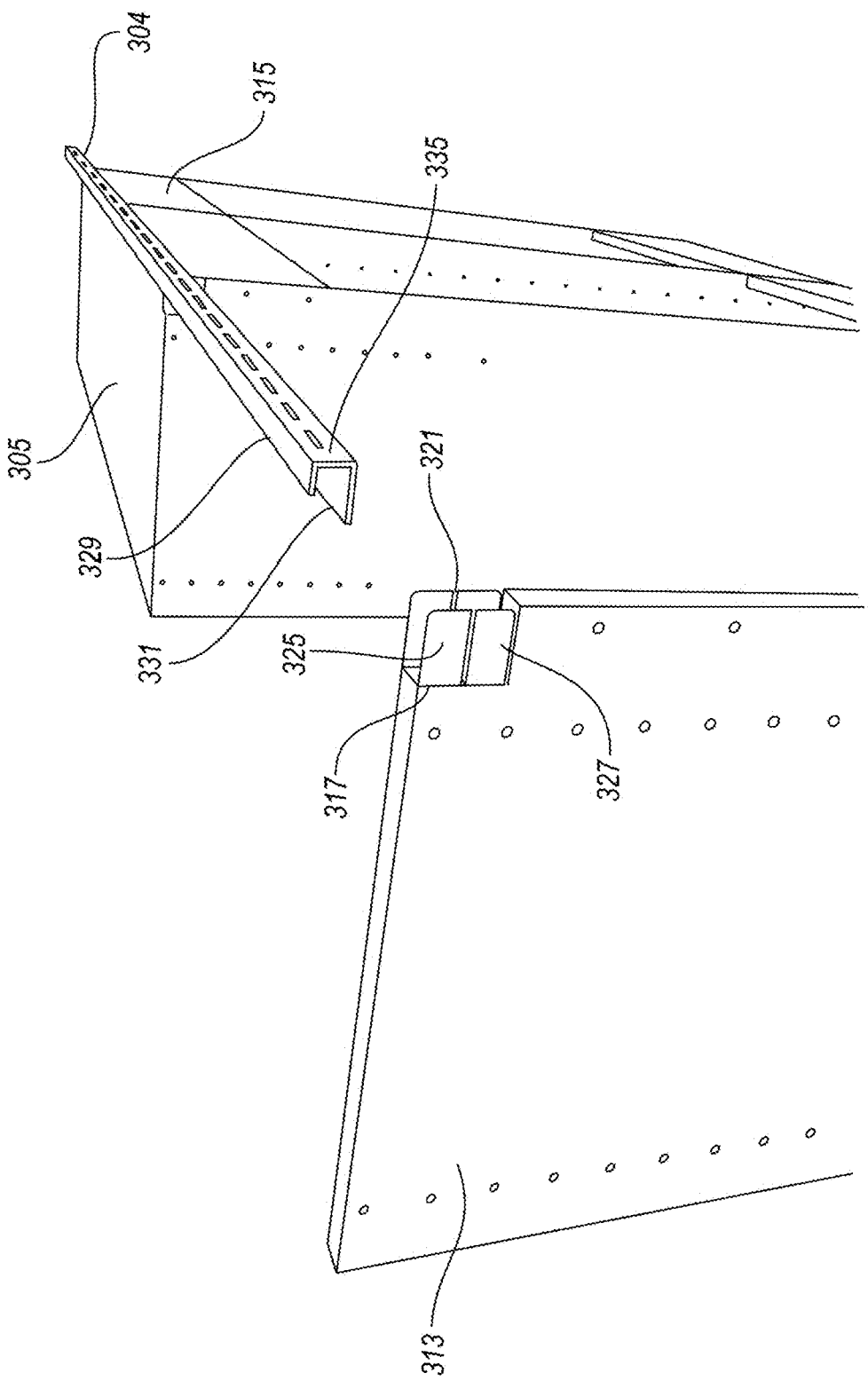
FIG. 24 is an exploded perspective view of a portion of the storage system shown in FIG. 23, and showing the back channel and an exemplary connector along the side wall.
Figure 25:
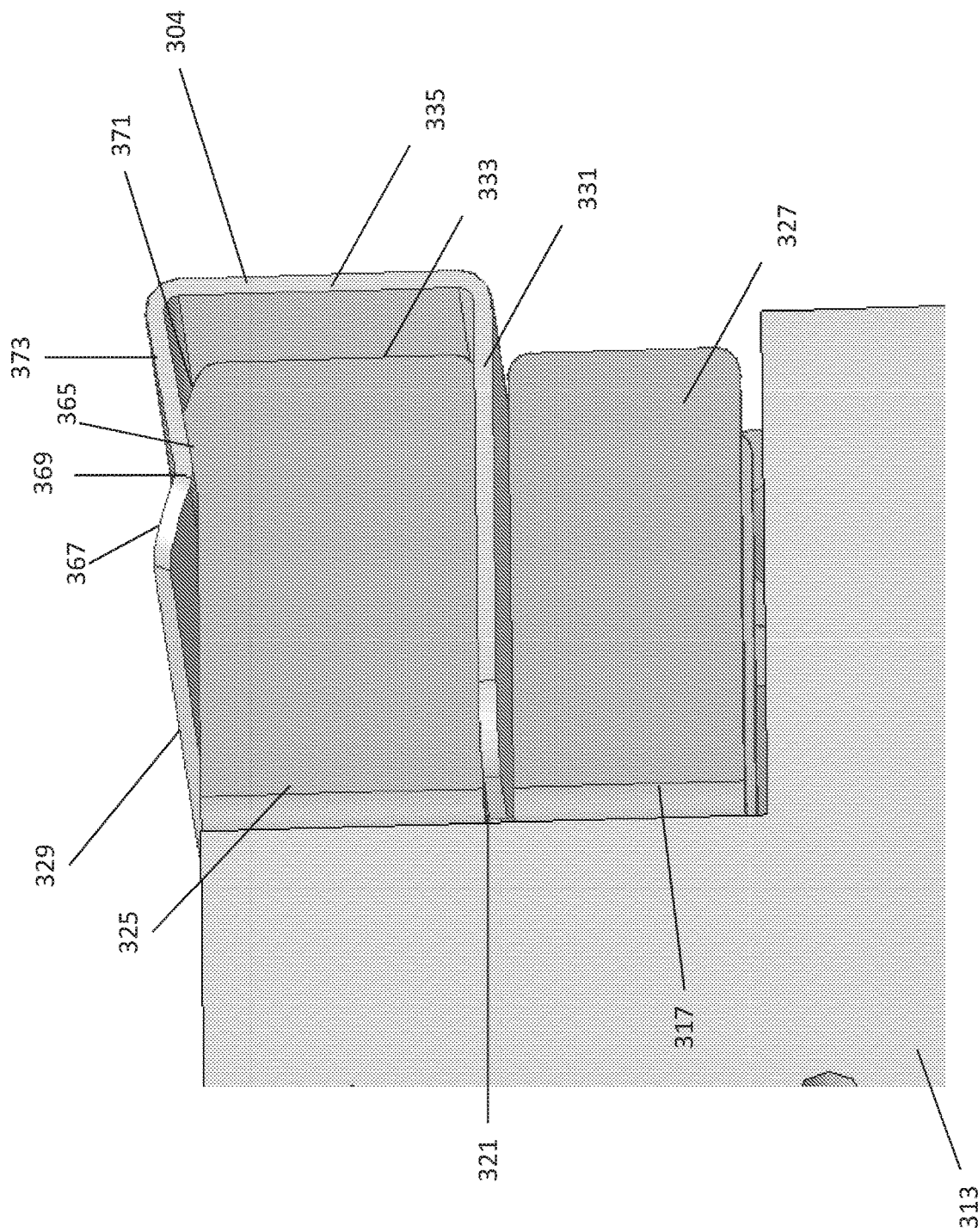
FIG. 25 is a perspective view of the connector and back channel shown in FIG. 24 after the connector has been engaged with the back channel to thereby support the side wall from the back channel.

FIGS. 24 and 25 show a connector 317 (e.g., stamped steel connector, etc.) along a side wall 313. The connector 317 is coupled to an upper back corner portion of the side wall 313. By way of example, the connector 317 may be coupled to the side wall 313 via mechanical fasteners (not shown), etc.

The connector 317 includes a slot 321 between upper and lower portions 325 and 327 of the connector 317. The connector's slot 321 is configured to receive a lower wall or surface 331 of the back channel 304. The upper portion 325 of the connector 317 is configured to be received generally between the upper and lower opposing walls 329, 331 of the back channel 304. The connector 317 is configured to support and/or hold the weight of the side wall 313 when the connector 317 is engaged with the back channel 304.

As shown in FIG. 25, the lower wall or surface 331 of the back channel 304 is within the connector's slot 321. The upper portion 325 of the connector 317 is received within the back channel 304 generally between the back channel's upper and lower walls 329, 331. The connector 317 is configured to support the weight of the side wall 313 when the connector 317 is engaged with the back channel 304 in this exemplary manner.

In this illustrated embodiment shown in FIG. 25, the connector 317 includes an upwardly protruding portion 365. The upper wall 329 of the back channel 304 includes a portion 367 extending or slanting downwardly. The back channel 304 may be made of a resiliently flexible material (e.g., sheet metal, etc.). The upper portion 325 of the connector 317 is configured to be positioned into the opening defined between the upper and lower walls 329, 331 of the back channel 304 and retained therebetween, e.g., via a snap, friction, or interference fit, etc.

As the connector's upper portion 325 is being initially inserted into the opening defined between the back channel's upper and lower walls 329, 331, a surface (e.g., a slanted and/or camming surface, etc.) of the connector's upper portion 325 contacts a surface (e.g., a slanted and/or camming surface, etc.) of the back channel's upper wall 329. This causes the back channel's upper wall 329 to move (e.g., flex, pivot, deform, etc.) upwardly relatively away from the connector's upper portion 325. The upward flexing of the back channel's upper wall 329 allows continued insertion of the connector's upper portion 325 into the opening defined between the back channel's upper and lower walls 329, 331. After the connector's upper portion 325 has been positioned sufficiently into the back channel's opening (e.g., with the end portion 333 of the connector's upper portion 325 in contact with the back channel's vertical back wall 335 as shown in FIG. 25, etc.) such that the highest portion of the connector's upper portion 325 has moved past or cleared the lowest portion 369 (e.g., intersection of the slanted surfaces, etc.) of the back channel's upper wall 329, the upper wall 329 may then move (e.g., flex or snap back, etc.) downwardly towards its original unflexed configuration. This downward movement positions respective surfaces 371 and 373 (e.g., latching surfaces, etc.) of the connector's upper portion 325 and the back channel's upper wall 329 into engagement (e.g., friction or interference fit, etc.) with each other, thereby latching or retaining the connector 317 within the back channel 304.

The back channel 304 is configured to be mountable (e.g., mechanically fastened, etc.) along a support surface, such as a back wall of a closet, etc. The back channel 304 includes openings 306 (e.g., elongate oval shaped openings, etc.) for receiving mechanical fasteners (e.g., drywall anchors, etc.) therethrough. The back channel 304 includes a back wall or surface 335 generally perpendicular to the opposing upper and lower walls 329, 331 of the back channel 304.

The back wall 335 and the opposing upper and lower walls 329, 331 cooperatively define a C-shaped or U-shaped profile such that the back channel 304 is configured (e.g., sized, shaped, located, etc.) for receiving a back portion of the top wall 305 and the upper portion 325 of the connector 317. The back channel 304 may include openings 309 (e.g., circular holes, etc.) along the bottom wall 331 for receiving mechanical fasteners (e.g., screws, nails, etc.) therethrough for mechanically fastening the back channel 304 to the underside of the top wall 305.

Figure 26:
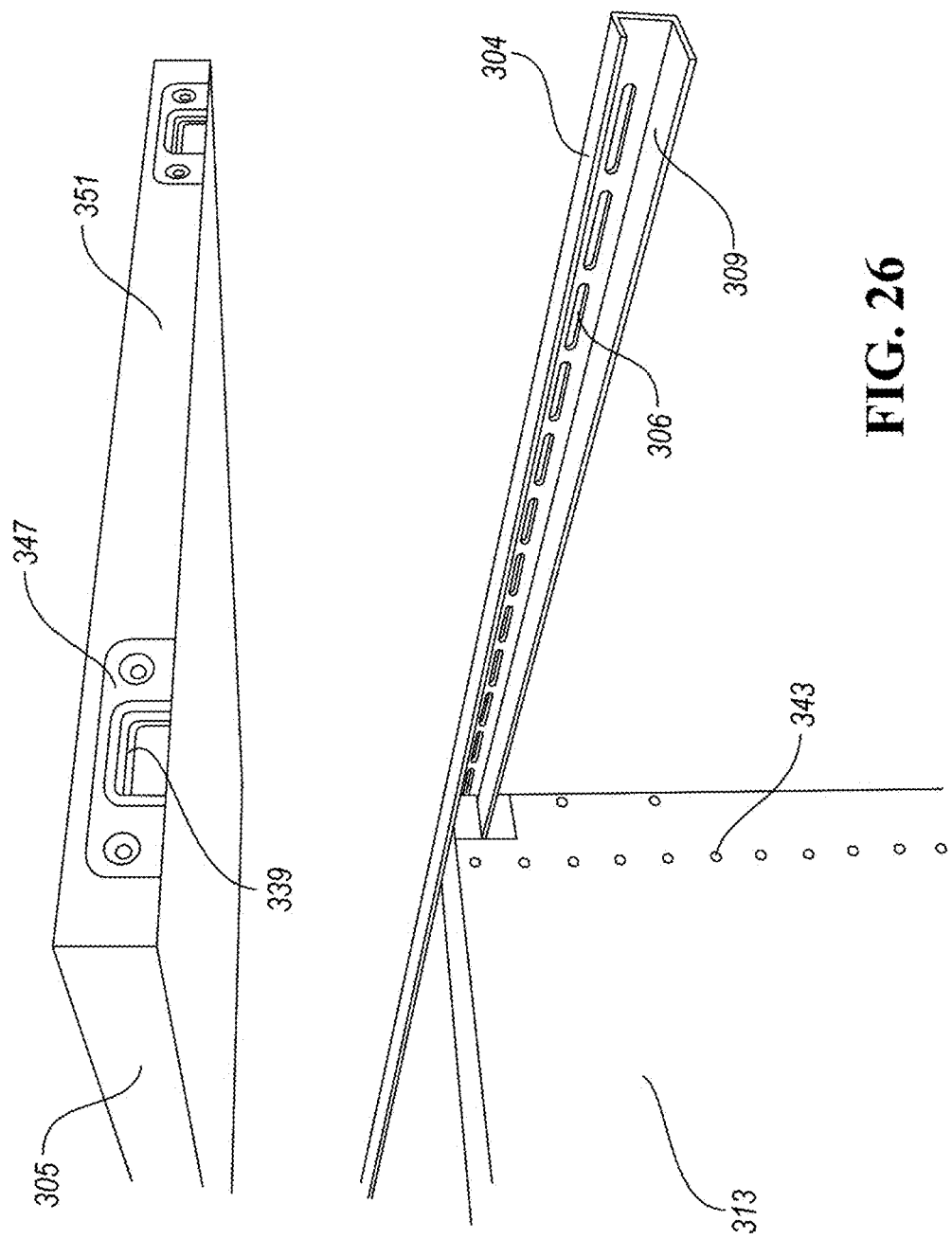
FIG. 26 is an exploded perspective view of a portion of the storage system shown in FIG. 23 including the back channel and the top wall, and also showing slots or channels along the side edge portion of the top wall.
Figure 27:
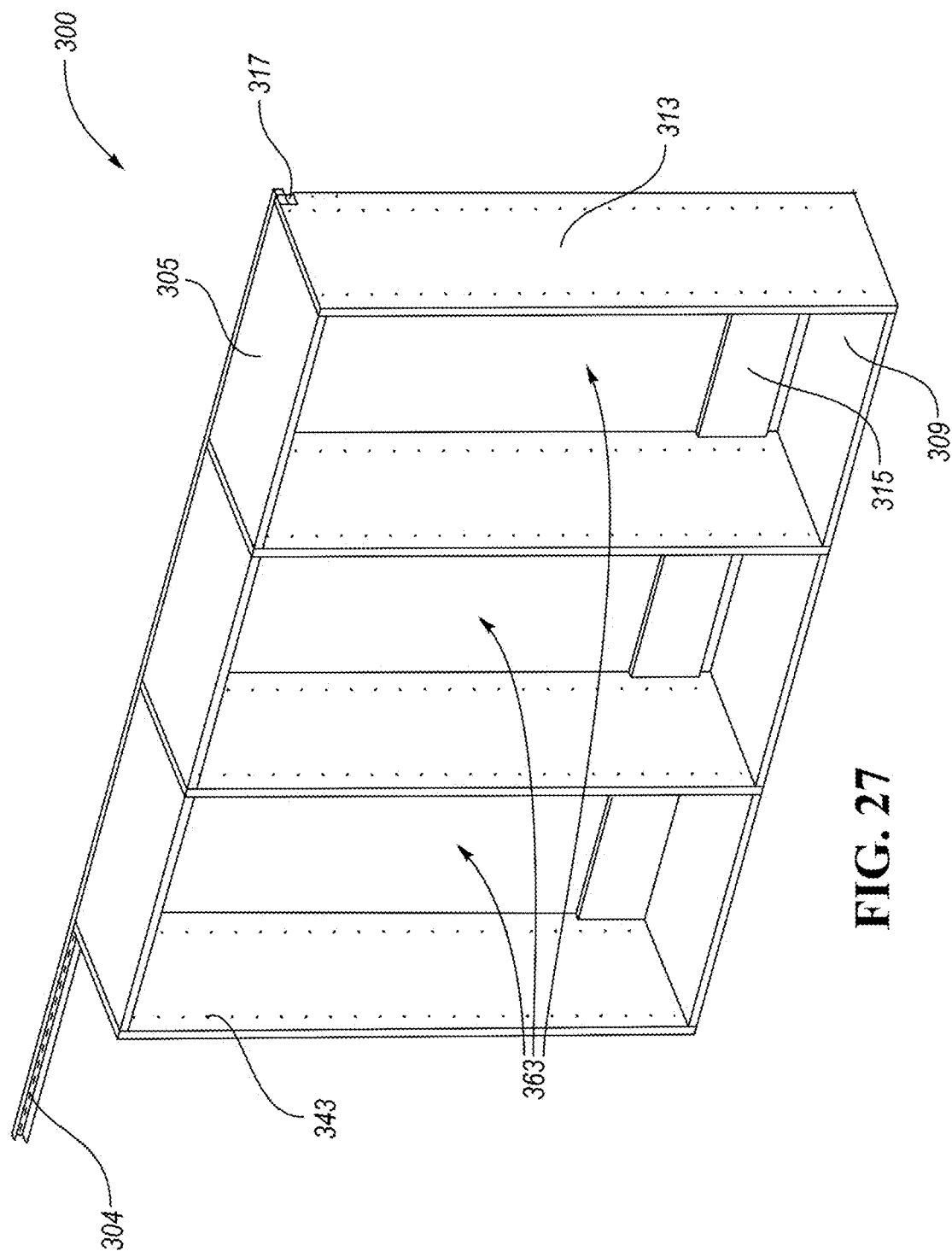
FIGS. 27 through 30 are perspective views of a storage system according to an exemplary embodiment, and showing four side walls or panels coupled or engaged with a back channel, three top walls or panels, three side walls or panels, three bottom walls or panels, and six back walls collectively forming three towers, cabinets, or assemblies.
Figure 28:
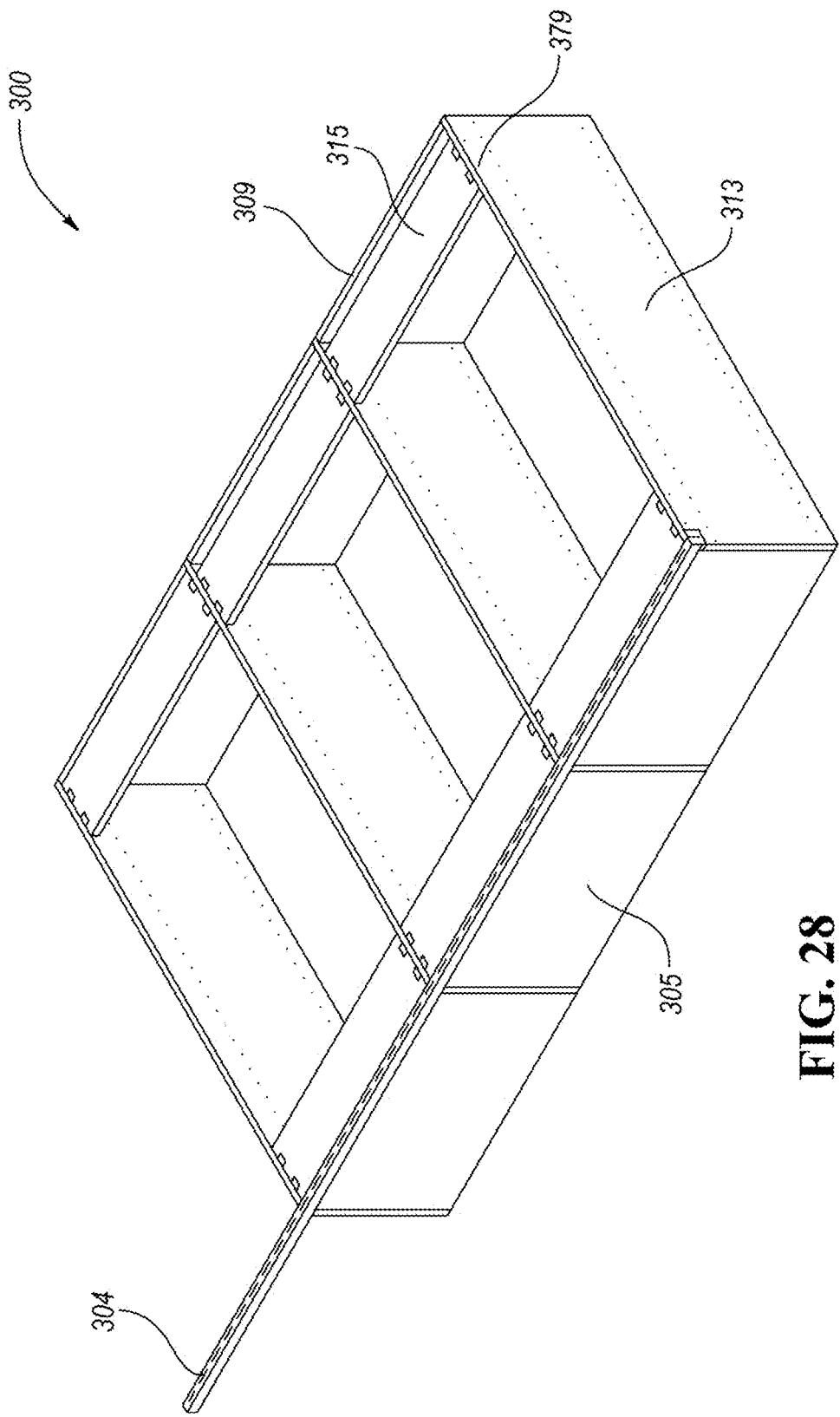

As shown in FIG. 26, the top wall 305 include slots or channels 339 configured to slidingly receive free end portions of shelf support pegs or pins (broadly, shelf supports). The free end portions are the protruding end portions of the shelf support pegs or pins that are not within the openings 343 along the side walls 313. The opposite end portions of the shelf support pegs or pins are engagingly received within openings 343 along the side walls 313. Accordingly, the top wall 305 may be coupled to and supported by the side walls 313 when the opposite end portions of the shelf support pegs or pins are engagingly received within the top wall's slots or channels 339 and the openings 343 along the side walls 313. In this exemplary embodiment, the slots or channels 339 are L-shaped slot-in channels that are defined by members 347 (e.g., plastic pieces, etc.) mechanically fastened to the side edge portions 351 of the top wall 305. Alternatively, other embodiments may include other means for coupling the top wall to the side walls.

FIGS. 27 through 30 show four side walls or panels 313 coupled or engaged with (e.g., hanging from, suspended from, supported by, etc.) the back channel 304. FIGS. 27 through 30 also show three top walls or panels 305, three bottom walls or panels 309, and six back walls or panels 315. The top walls 305, bottom walls 309, side walls 313, and back walls 315 collective form three towers, cabinets, or assemblies 363, which may be assembled in a modular way.

Each top or upper wall 305 may be positioned relative to the back channel 304 and a corresponding pair of the side walls 313 such that a back portion of the top wall 305 is within the back channel 304. The opposing first and second side edge portions of the top wall 305 may be respectively supported by shelf support pegs or posts (not shown) engagingly received within openings 343 along the side walls 313 and the slots 339 (FIG. 26) along the side edge portions 351 of the top wall 305.

Figure 29:
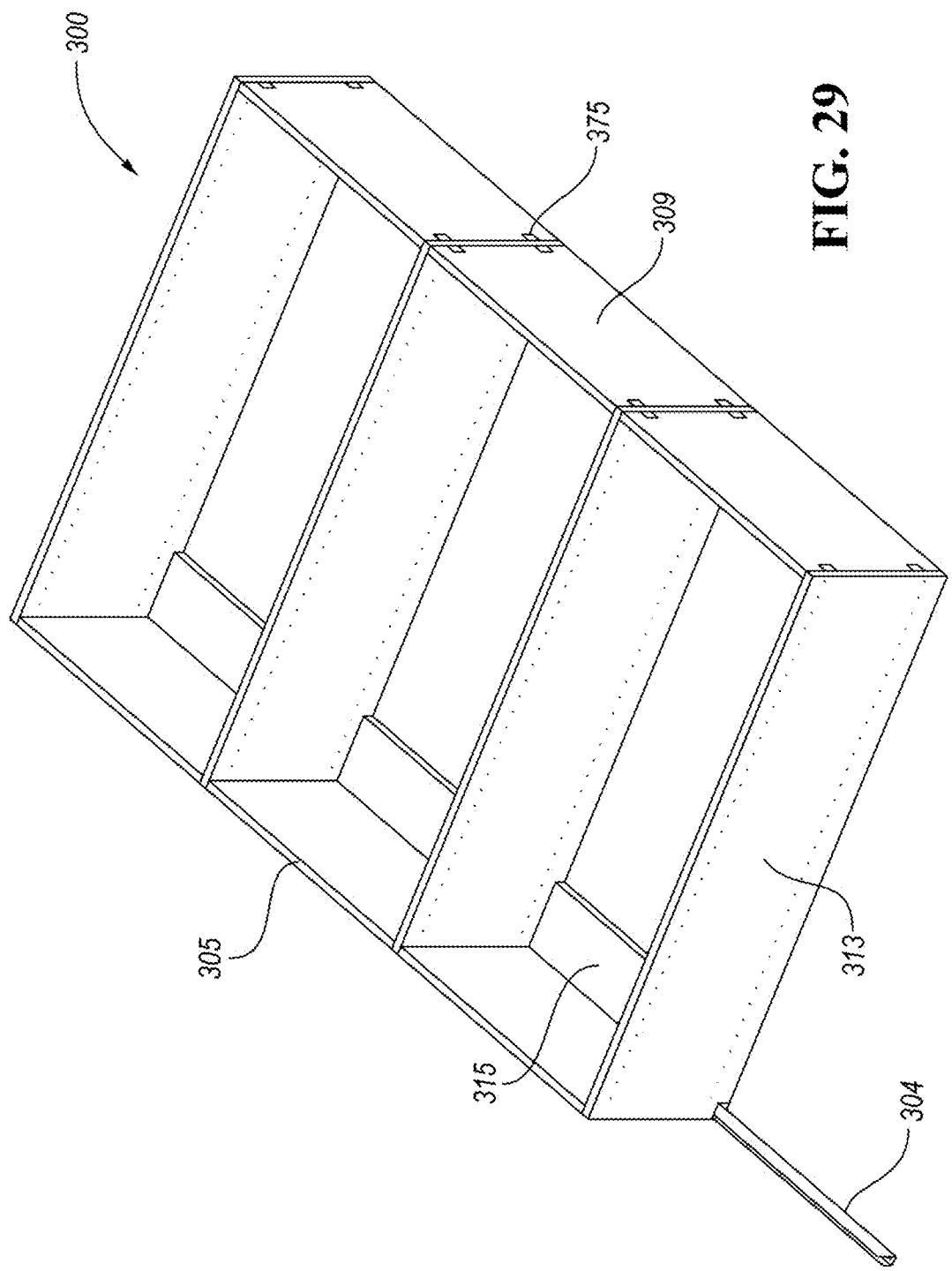
Figure 30:
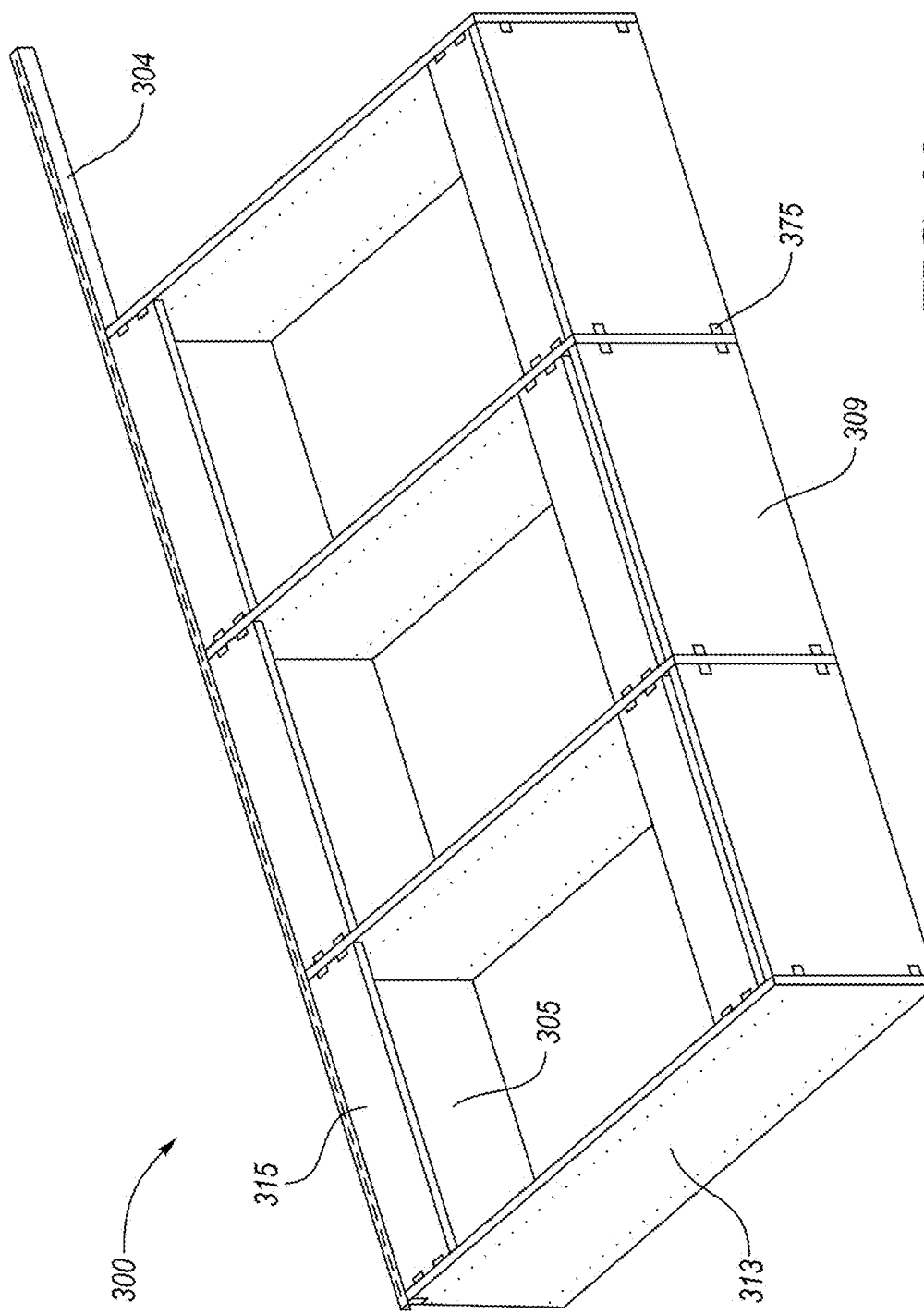

Each bottom or lower wall 309 may be positioned between a corresponding pair of the side walls 313. The bottom or lower walls 309 may be coupled to the side walls 313 by using dowels or pins (e.g., wooden dowels, etc.) and furniture connecting cam fittings or locks 375 (FIGS. 29 and 30). End portions of the dowels or pins may be engagingly received within openings 343 along the side walls 313. Opposite end portions of the dowels or pins may be positioned through openings 355 (FIG. 23) along the side edge portions 359 of the bottom wall 309, and engaged with furniture connecting cam fittings or locks 375 (FIGS. 29 and 30). within openings along a bottom of the bottom wall 309.

Figure 31:
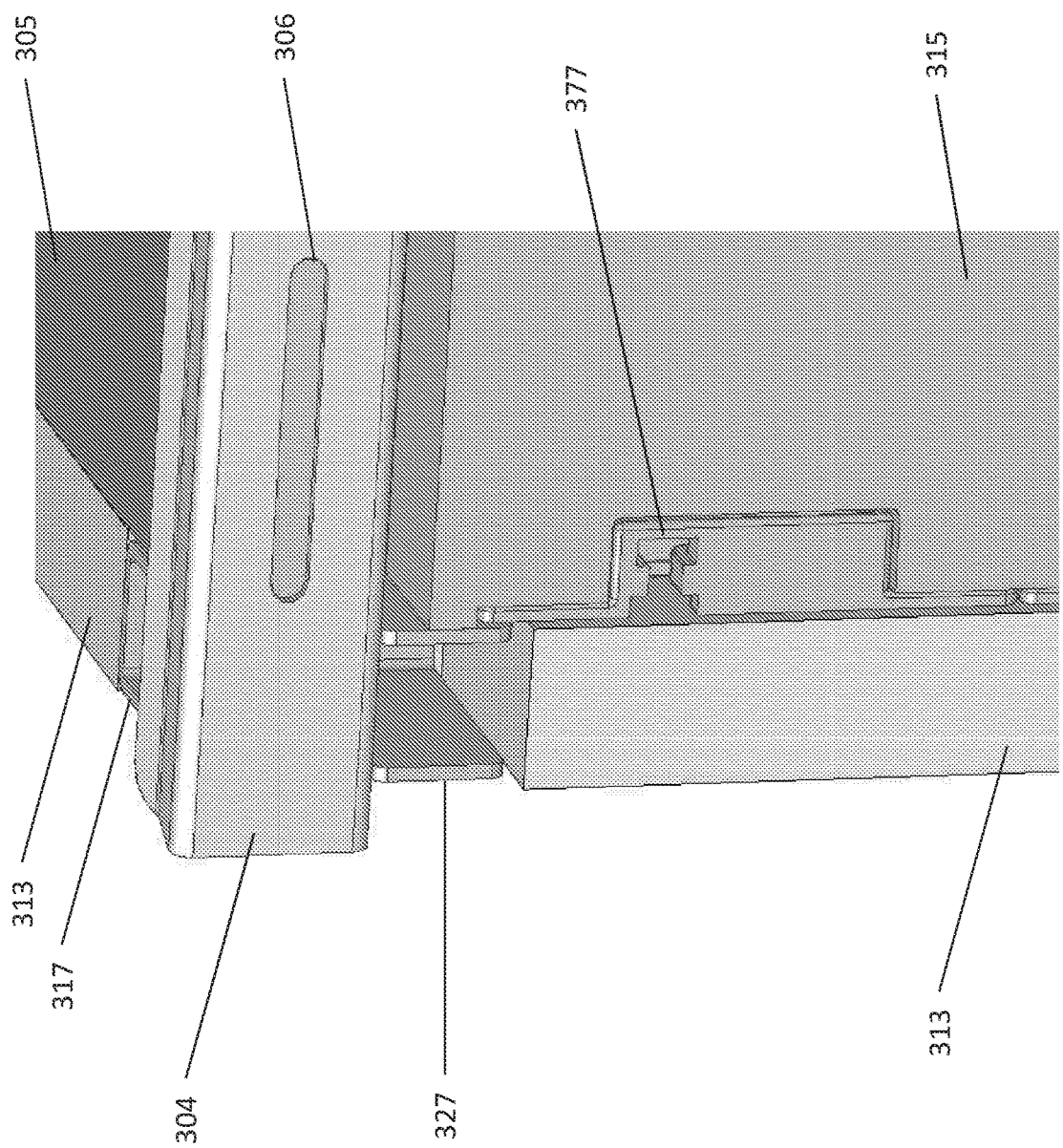
FIG. 31 is a perspective view of a portion of the storage system shown in FIG. 27, and showing the back channel, the lower portion of the connector along the side wall, the top wall, and the back wall or panel.
Figure 32:
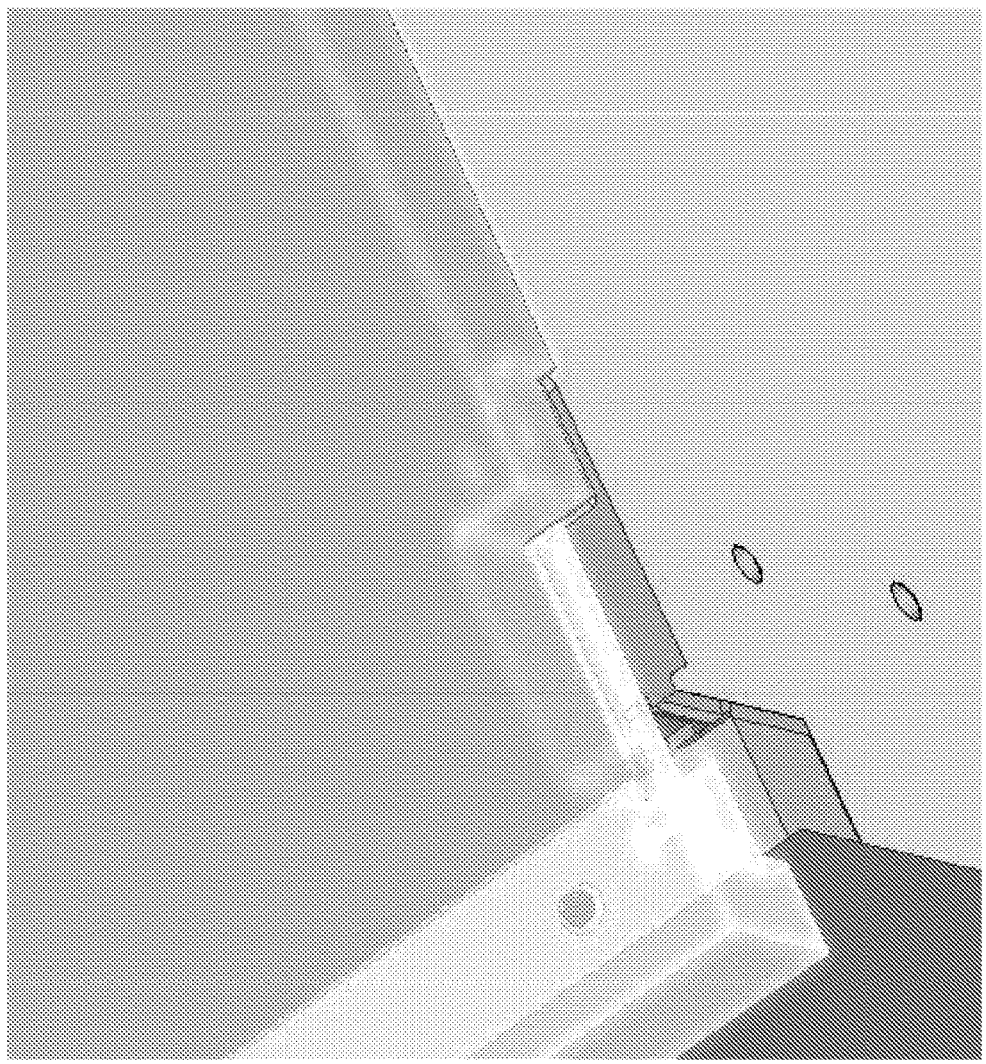
FIG. 32 is a perspective view of a portion of the storage system shown in FIG. 31, and showing the back wall coupled to the side wall via fasteners coupled to the side wall and engagingly received within openings of the back wall.

Each back wall 315 may be positioned between a corresponding pair of the side walls 313. FIGS. 31 and 32 illustrate an exemplary method by which a back wall 315 may be coupled to the side walls 313. As shown in FIG. 31, the back wall 315 includes an opening 377 (e.g., a capital H shaped slot, etc.) configured for engagement with a fastener (e.g., plastic fastener, etc.) for coupling the back wall 315 to the side wall 313. The fastener may be positioned through an opening 379 (FIG. 28) in the side wall 313 such that an end portion of the fastener is engaged within the opening 377 of the back wall 315.

By way of example, the fastener may include a first portion (e.g., threaded portion, etc.) coupled to (e.g., mechanically fastened, threaded into a threaded opening, friction fit into an opening, adhesively attached, etc.) to the side wall 313. The fastener may also include a second portion (e.g., a rectangular head, portion larger than the threaded portion, etc.) configured to be received within the back wall's opening 377 in a first orientation and then engaged within the back wall's opening 377 in a second orientation (e.g., rotated 90 degrees from the first orientation, etc.).

In exemplary embodiments, the storage system 300 and/or one or more components thereof may provide one or more (but not necessarily any or all) of the following advantages or features, such as allowing towers to be grouped together and share gable components, which, may, in turn, allow for reduced total cost and reduced part counts. Exemplary embodiments may include slot-In channels that allow for adding top shelves and back cleats in very tight footprints, which may help when slotting in one or more towers between two shelves. Exemplary embodiments may include stamped steel connectors for holding the weight of the gables when coupled to back channels. Exemplary embodiments may allow a user to integrate cabinets into a storage system in a modular way, e.g., the gable can daisy-chain to create towers to the overall storage system, etc. Exemplary embodiments may allow towers to be assembled piece-by-piece directly on the back channel, e.g., by connecting and/or hanging panels together in a linear series or daisy chain, etc.

FIG. 33 illustrates another exemplary embodiment of a storage system 400 embodying one or more aspects of the present disclosure. The storage system 400 includes a tower unit 463 (e.g., walls, drawers, etc.). In some exemplary embodiments, the tower unit 463 may be provided as a kit that can be assembled on the ground and/or that is movable along a back channel 404 (broadly, a back support member) before being secured in place. The tower unit 463 may include and/or be used with sliding drawers 481. The sliding drawers 481 may be provided as a drawer kit 483.

As shown in FIG. 33, the storage system 400 also includes side channels, brackets, or cleats 408 (e.g., L-brackets, etc.) (broadly, side support members), shelf trim pieces 424, shelves 412, end pole cups 448, and support brackets 470 (e.g., angle brackets, etc.). The storage system 400 may also include hang rods or poles 456 (FIGS. 34, 35, and 41) that would be supported below the shelves 412 by the pole cups 448 and support brackets 470, such as shown in FIG. 1 for the hang rod or pole 156. The side channels 408, shelf trim pieces 424, shelves 412, end pole cups 448, and support brackets 470 may have features identical or similar to the corresponding features of the side channels 108, shelf trim pieces 124, shelves 112, end pole cups 148, and support brackets 170 of the storage system 100 shown in FIG. 1 and described above.

Figure 35:
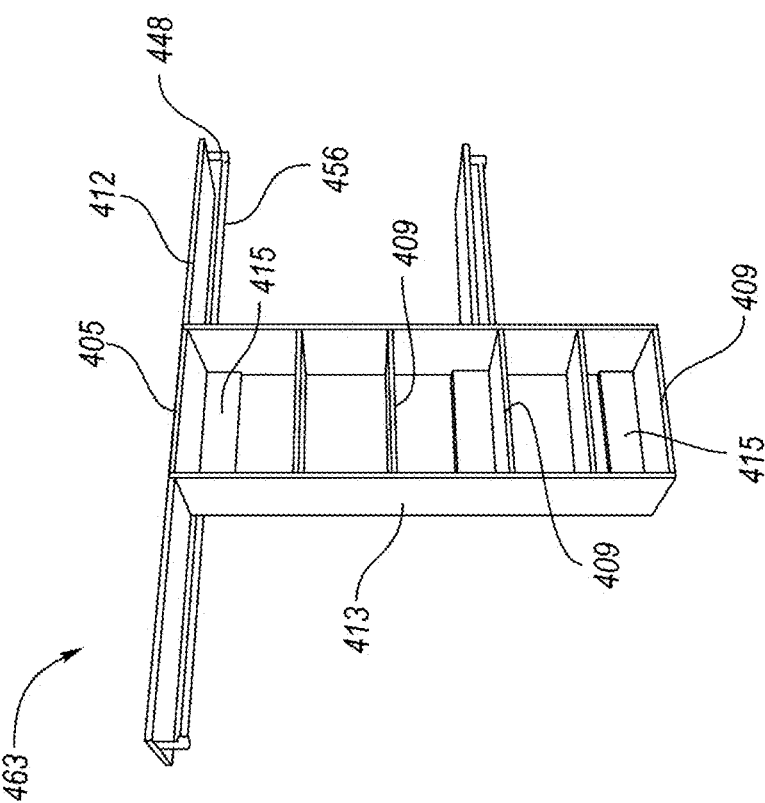
FIGS. 34 and 35 are perspective views of shorter and taller tower kits, respectively, according to exemplary embodiments.
Figure 34:
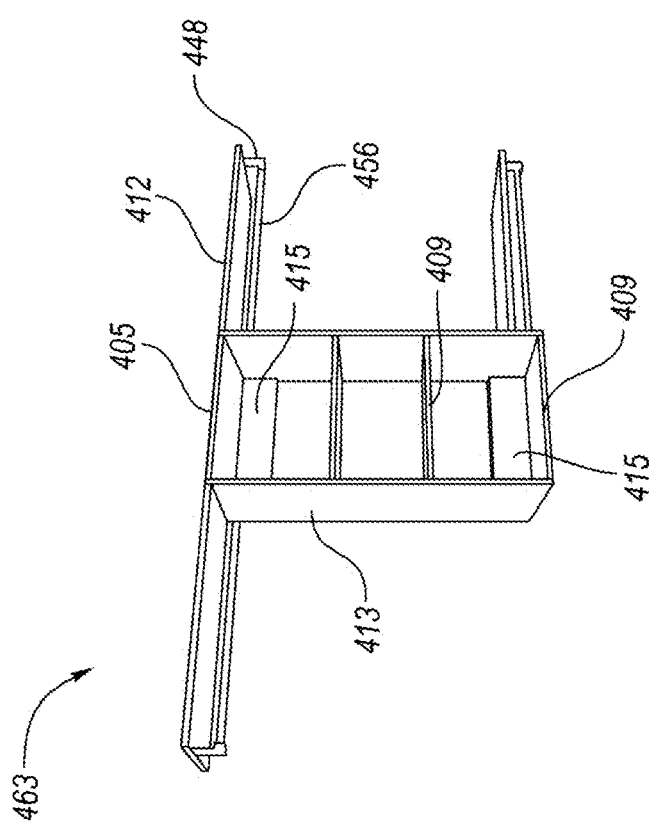

FIGS. 34 and 35 illustrate shorter and taller tower kits 463, respectively, according to exemplary embodiments. Also shown in FIGS. 34 and 35 are hang rods or poles 456 supported below the shelves 412 by the pole cups 448. The tower kits 463 include top or upper walls 405, bottom or lower walls 409, side walls 413, and back walls 415 that may be assembled together (e.g., on the ground, work bench, etc.) and/or that may be movable along the back channel 404 before being secured in place. In some exemplary embodiments, a tower base kit 463 may be provided with one or more sliding drawers and/or may be used with a drawer kit 483 (FIG. 33). Additional embodiments may include shoe towers, corner towers, display cases, etc. The top or upper walls 405, bottom or lower walls 409, side walls 413, and back walls 415 may be assembled in a similar manner as that described above for assembling the corresponding the top or upper walls 305, bottom or lower walls 309, side walls 313, and back walls 315 of the storage system 300 shown in FIG. 23.

Figure 36:
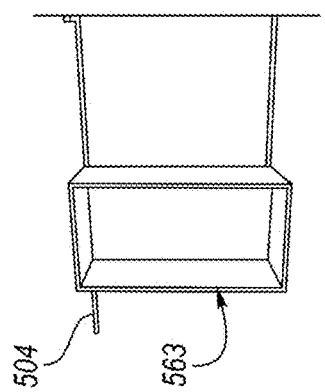

FIGS. 36 through 42 illustrate exemplary steps for installing a storage system (e.g., storage system 300, storage system 400, etc.) according to an exemplary embodiment embodying one or more aspects of the present disclosure. As shown in FIG. 36, a tower or cabinet 536 may be added onto a back channel 504, which, in turn, has been coupled to (e.g., mechanically fastened, etc.) a support surface (e.g., closet wall, etc.). During this step, the tower's side walls may be coupled to (e.g., hung or suspended from, etc.) the back channel in a similar manner as that shown in FIGS. 24 and 25, e.g., via connectors 317, etc. The tower's top, bottom, and side walls may first be assembled on the ground before the tower is added onto the back channel 504.

Figure 37:
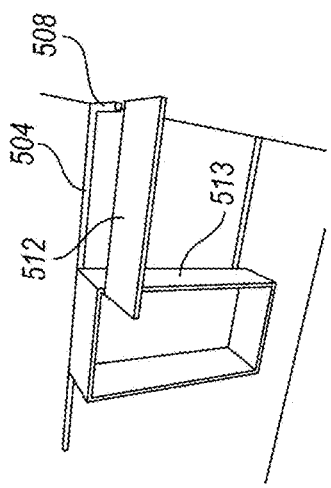
FIGS. 36 through 42 shows various steps for installing a storage system according to an exemplary embodiment.

As shown in FIG. 37, a first or upper shelf 512 may be added. The upper shelf 512 may be supported generally by the back channel 504, shelf support pegs or pins coupled to the side wall 513 of the tower 536, and a side bracket 508 (e.g., L-bracket, etc.) coupled (e.g., mechanically fastened, etc.) to a support surface (e.g., closet wall, etc.).

Figure 38:
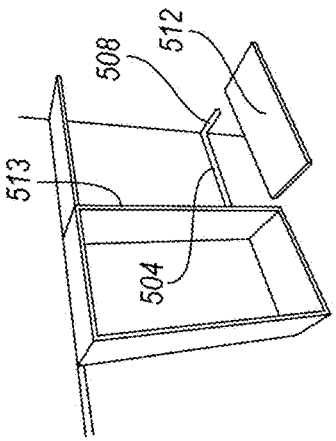

As shown in FIG. 38, a second or lower shelf 512 may be added. The lower shelf 512 may be supported generally by a lower back channel 504, shelf support pegs or pins coupled to the side wall 513 of the tower 536, and a side bracket 508 (e.g., L-bracket, etc.) coupled (e.g., mechanically fastened, etc.) to a support surface (e.g., closet wall, etc.).

Figure 39:
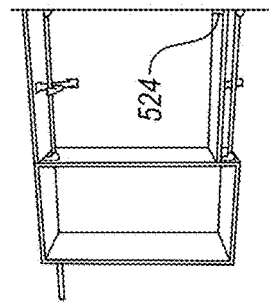

As shown in FIG. 39, upper and lower (or first and second) support brackets 570 (e.g., center angle brackets, etc.) may be added. The upper support bracket 570 may be coupled (e.g., mechanically fastened, etc.) to a support surface (e.g., closet wall, etc.) and to the underside of the upper shelf 512. The lower support bracket 570 may be coupled (e.g., mechanically fastened, etc.) to a support surface (e.g., closet wall, etc.) and to the underside of the lower shelf 512.

Figure 40:
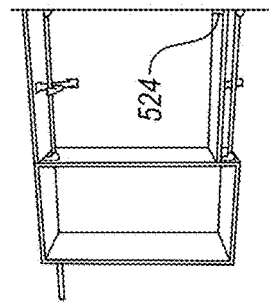

As shown in FIG. 40, upper and lower pairs of pole cups 548 may be added. The upper pair of pole cups 548 may be coupled along the opposing edge portions of the upper shelf 512. The lower pair of pole cups 548 may be coupled along the opposing edge portions of the lower shelf 512.

Figure 41:
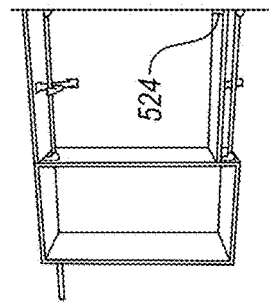

As shown in FIG. 41, upper and lower hang rods or poles 556 may be added. The upper and lower hang rods or poles 556 may be supported generally under or beneath the upper and lower shelves 512, respectively. Each end portion of the upper hang rod 556 may be positioned within and supported by a U-shaped cradle or saddle portion of a corresponding one of the upper pair of pole cups 548. The middle portion of the upper hang rod 556 may be positioned within and supported by a U-shaped saddle or cradle portion of the upper support bracket 570. Likewise, each end portion of the lower hang rod 556 may be positioned within and supported by a U-shaped cradle or saddle portion of a corresponding one of the lower pair of pole cups 548. The middle portion of the lower hang rod 556 may be positioned within and supported by a U-shaped saddle or cradle portion of the lower support bracket 570.

Figure 42:
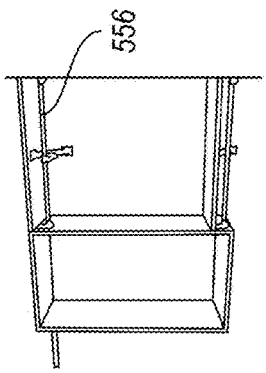

As shown in FIG. 42, trim pieces 524 may be added along the side edge portions of the upper and lower shelves 512. For example, the trim pieces may be added as disclosed herein and/or as shown in FIGS. 1-4. Alternatively, the trim pieces may be eliminated (e.g., FIGS. 40 and 41, etc.) and/or be configured differently (e.g., thinner, wider, etc.) in other exemplary embodiments.

FIGS. 43 and 44 illustrate a portion of storage system 600 according to an exemplary embodiment embodying one or more aspects of the present disclosure. As shown in FIG. 43, this exemplary embodiment does not include a trim piece along the side edge portion of the top wall or panel 605. As shown in FIG. 44, the side channel, bracket, or cleat 608 (broadly, side support member) includes a front corner vertical wall portion 680 configured for preventing the top wall 605 from sliding forwardly along the support surface 620 of the side channel 608. Also shown in FIG. 44 are a back channel 604 and support bracket 670.

According to various aspects, exemplary embodiments are disclosed herein of storage systems, such as a closet storage system including a shelf and a hang rod or pole supported beneath the shelf. In an exemplary embodiment, a closet storage system generally includes a hang rod, a back channel, first and second side brackets, first and second shelf trims, first and second end cups, a shelf, and at least one support bracket. The hang rod includes opposing first and second end portions. The back channel is configured to be mountable along a back wall of a closet. The first and second side brackets are configured to be mountable along opposing first and second sidewalls of the closet. The first shelf trim configured to be coupled to the first side bracket. The second shelf trim configured to be coupled to the second side bracket. The shelf is configured to be supported by the back channel and the first and second side brackets. The first end cup is configured to be coupled to and/or supported generally between portions of the first shelf trim and the first side bracket. The second end cup is configured to be coupled to and/or supported generally between portions of the second shelf trim and the second side bracket. The at least one support bracket is configured to be coupled to an underside of the shelf and to the back wall of the closet for providing additional support for the shelf. The hang rod is supportable beneath the shelf when the first and second end portions of the hang rod are supported by the respective first and second end cups.

The at least one support bracket may include a hang rod support member configured to support a middle portion of the hang rod that is between and spaced apart from the first and second end portions of the hang rod, to thereby provide additional support for the hang rod.

The at least one support bracket may include a shelf support member having opposing first and second end portions. The first end portion may be configured to be coupled to the back wall of the closet. The second end portion may be configured to be coupled to the underside of the shelf.

The at least one support bracket may also include a hang rod support member having opposing first and second end portions. The first end portion may be integral with or may be configured to be coupled to the shelf support member. The second end portion may be configured to receive a portion of the hang rod therein.

The shelf support member may be configured to extend diagonally between the shelf and the back wall of the closet when the first and second end portions of the shelf support member are respectively coupled to the back wall of the closet and the underside of the shelf.

The second end portion of the hang rod support member may include a cradle portion configured to receive the portion of the hang rod therein.

The hang rod support member may comprise a hook. The second end portion of the hang rod support member may include a cradle portion that is generally U-shaped and/or shaped to correspond with an outer diameter of the hang rod. The middle portion of the hang rod may be positionable within and supportable atop the cradle portion.

The first end cup may include a first cradle portion configured such that the first end portion of the hang rod is positionable within and supportable atop the first cradle portion. The second end cup includes a second cradle portion configured such that the second end portion of the hang rod is positionable within and supportable atop the second cradle portion. The at least one support bracket may include a cradle portion configured such that a middle portion of the hang rod is positionable within and supportable atop the cradle portion of the at least one support bracket. The first and second end cups and the at least one support bracket may be configured so as to not interfere with sliding movement of clothes hangers along the hang rod such that the clothes hangers are freely slidable along the hang rod without interference from the first and second end cups and the at least one support bracket.

The at least one support bracket may comprise at least two support brackets spaced apart from each other and spaced apart from the first and second end portions of the hang rod.

The first end cup may include a first protrusion along an upper portion of the first end cup and positionable between the portions of the first shelf trim and the first side bracket. The first end cup may include a first cradle portion along a lower portion of the first end cup and configured for receiving the first end portion of the hang rod therein.

The second end cup may include a second protrusion along an upper portion of the second end cup and positionable between the portions of the second shelf trim and the second side bracket. The second end cup may include a second cradle portion along a lower portion of the second end cup and configured for receiving the second end portion of the hang rod therein.

The first end cup may include a first cradle portion that is generally U-shaped and/or shaped to correspond with an outer diameter of the first end portion of the hang rod. The first end portion of the hang rod may be positionable within and supportable atop the first cradle portion.

The second end cup may include a second cradle portion that is generally U-shaped and/or shaped to correspond with an outer diameter of the second end portion of the hang rod. The second end portion of the hang rod may be positionable within and supportable atop the second cradle portion.

The first side bracket may comprise a first L-bracket including a bottom surface having a cut-out. The first end cup may include a generally T-shaped protrusion along an upper portion of the first end cup and configured to engage the cut-out of the first L-bracket to position the first end cup relative to the first L-bracket.

The second side bracket may comprise a second L-bracket including a bottom surface having a cut-out. The second end cup may include a generally T-shaped protrusion along an upper portion of the second end cup and configured to engage the cut-out of the second L-bracket to position the second end cup relative to the second L-bracket.

Each of the first and second side brackets may include a vertical portion and a shelf support surface. The vertical portion may be configured to be mountable to the corresponding first or second sidewall of the closet. The shelf support surface may extend generally perpendicularly to and horizontally outward from the vertical portion such that the vertical portion and the shelf support surface cooperatively define a generally L-shaped profile. The shelf support surface may be configured for receiving a corresponding first or second side edge portion of the shelf thereon. Each of the first and second side brackets may include openings spaced apart along the vertical portion and configured for receiving mechanical fasteners therethrough for mechanically fastening the vertical portion to the corresponding first or second sidewall of the closet. Each of the first and second side brackets may include openings spaced apart along the shelf support surface and configured for receiving mechanical fasteners therethrough for mechanically fastening the shelf support surf ace to the underside of the shelf.

The first side bracket may include a shelf support surface configured for receiving a first side edge portion of the shelf thereon. The second side bracket may include a shelf support surface configured for receiving a second side edge portion of the shelf thereon. The back channel may be configured for receiving a back portion of the shelf therein. The shelf may be positionable relative to the back channel and the first and second side brackets such that the back portion of the shelf is positioned within the back channel and such that the opposing first and second side edge portions are positioned atop the shelf support surfaces of the respective first and second side brackets.

The shelf may include opposing first and second side edge portions each including a top surface, a front surface, and a bottom surface. The first shelf trim may be configured to be positioned along the first side edge portion of the shelf such that the first shelf trim extends over the top surface and the front surface and partially under the bottom surface of the first side edge portion of the shelf. The second shelf trim may be configured to be positioned along the second side edge portion of the shelf such that the second shelf trim extends over the top surface and the front surface and partially under the bottom surface of the second side edge portion of the shelf.

The back channel may include opposing upper and lower walls and a back wall generally perpendicular to the upper and lower walls such that the back wall and the upper and lower walls cooperatively define a generally U-shaped profile configured for receiving a back portion of the shelf. The back channel may include openings spaced apart along the back wall and configured for receiving mechanical fasteners therethrough for mechanically fastening the back channel to the back wall of the closet. The back channel may also include openings spaced apart along the lower wall and configured for receiving mechanical fasteners therethrough for mechanically fastening the back channel to the underside of the shelf.

The first shelf trim may include spaced apart protrusions configured for sliding engagement within one or more openings of the first side bracket. Sliding of the protrusions of the first shelf trim backwardly or forwardly along the one or more openings of the first side bracket may adjust a position of the first shelf trim relative to the first side bracket.

The second shelf trim may include spaced apart protrusions configured for sliding engagement within one or more openings of the second side bracket. Sliding of the protrusions of the second shelf trim backwardly or forwardly along the one or more openings of the second side bracket may adjust a position of the second shelf trim relative to the second side bracket.

The first and second end portions of the hang rod may be supported from below by the first and second end cups such that the first and second end cups do not interfere with sliding movement of clothes hangers along the hang rod. The clothes hangers may thus be freely slidable along the hang rod without interference from the first and second end cups.

In another exemplary embodiment, a method generally includes mounting a back channel along a back wall of a closet, mounting first and second side brackets along opposing first and second sidewalls of the closet, coupling a first shelf trim to the first side bracket, coupling a second shelf trim to the second side bracket, coupling and/or supporting a first end cup generally between portions of the first shelf trim and the first side bracket, coupling and/or supporting a second end cup generally between portions of the second shelf trim and the second side bracket, positioning a shelf relative to the back channel and the first and second side brackets such that a back portion of the shelf is within the back channel and opposing first and second side edge portions of the shelf are respectively supported by the first and second side brackets, coupling at least one support bracket to an underside of the shelf and to the back wall of the closet, and supporting opposing first and second end portions of a hang rod using the respective first and second end cups such that the hang rod is positioned beneath the shelf.

The method may further comprise supporting a middle portion of the hang rod that is between and spaced apart from the first and second end portions of the hang rod using the at least one support bracket.

In an exemplary embodiment, a storage system generally includes at least one back channel mountable along a support surface (e.g., a back wall of a closet, etc.). At least one wall or panel of the storage system is mountable (e.g., via a connector, etc.) along the back channel.

The storage system may also generally include one or more of a hang rod, side bracket, shelf trim, end cup, support bracket, and/or shelf. The shelf may be supportable by the back channel, a pair of side brackets, and at least one support bracket. The side brackets may be mountable along sidewalls of the closet and/or to the at least one wall of the storage system that is mountable along the back channel. The hang rod may supportable beneath the shelf when first and second end portions of the hang rod are supported by respective first and second end cups.

The connector may be disposed at and/or coupled to an upper back corner portion of the at least one wall.

The back channel may include upper and lower opposing walls. The connector may include an upper portion, a lower portion, and a slot generally between the upper and lower portions. The slot of the connector may be configured to receive the lower wall of the back channel. The upper portion of the connector may be configured to be received within the back channel generally between the upper and lower opposing walls of the back channel. The connector maybe configured to support and/or hold the weight of the at least one wall when the connector is engaged with the back channel such that the lower wall of the back channel is within the connector's slot and such that the upper portion of the connector is within the back channel generally between the back channel's upper and lower opposing walls. The connector and the back channel may be configured such that an interference, friction, or snap fit is created between the upper portion of the connector and the upper and lower opposing walls of the back channel when the connector is engaged with the back channel.

The storage system may further includes a top wall having a side edge portion and one or more slot-in channels along the side edge portion for coupling the top wall to the at least one wall. The one or more slot-in channels may comprise one or more L-shaped slots configured for slidably receiving an end portion of a shelf support peg or pin. The top wall may include a back portion, and the back channel is configured for receiving the back portion of the top wall therein.

The at least one wall may include first and second side walls including respective first and second connectors for mounting the first and second side walls along the back channel. The storage system may further include a top wall having first and second opposite side edge portions and one or more slot-in channels along the first and second side edge portions for coupling the top wall to the respective first and second side walls. The one or more slot-in channels may comprise one or more L-shaped slots configured for slidably receiving an end portion of a shelf support peg or pin. The top wall may include a back portion, and the back channel may be configured for receiving the back portion of the top wall therein.

The storage system may further include a plurality of walls configured to be coupled to the first and second side walls. The plurality of walls may include a top wall, a back wall, and a bottom wall. The top wall, back wall, and bottom wall may be configured to be coupled to the first and second side walls before the first and second side walls are mounted along the back channel. For example, the top wall, back wall, bottom wall, and first and second side walls may be assembled together (e.g., on the ground, work bench, or other support surface, etc.) before the first and second side walls are mounted along the back channel such that the top wall, back wall, bottom wall, and first and second side walls may thereby be added collectively as a single unit along the back channel. The top wall, back wall, bottom wall, and first and second side walls may be slidable collectively as the single unit along the back channel until secured in place.

The top wall, back wall, and bottom wall may be configured to be coupled to the first and second side walls after the first and second side walls are mounted along the back channel. The plurality of walls may be assembled piece-by-piece and/or modularly to the first and second side walls mounted along the back channel. The top wall may include first and second opposite side edge portions and one or more slot-in channels along the first and second side edge portions for coupling the top wall to the respective first and second side walls. The one or more slot-in channels may comprise one or more L-shaped slots configured for slidably receiving an end portion of a shelf support peg or pin. The top wall may include a back portion, and the back channel may be configured for receiving the back portion of the top wall therein.

In exemplary embodiments, the connector may be a stamped steel connector.

In exemplary embodiments, the storage system may be a closet storage system. The back channel may be configured to be mountable along a back wall of a closet.

In exemplary embodiments, a method of installing a storage system generally includes mounting the at least one wall along the back channel using the connector. The method may also include mounting the back channel along a back wall of a closet.

The at least one wall may include first and second side walls. And, the method may include assembling a top wall, a back wall, a bottom wall, and the first and second side walls together before mounting the first and second side walls along the back channel. After assembling, the method may include adding the top wall, back wall, bottom wall, and first and second side walls collectively as a single unit along the back channel. The method may further include sliding the top wall, back wall, bottom wall, and first and second side walls collectively as the single unit along the back channel before securing in place.

The at least one wall includes first and second side walls. And, the method may include mounting the first and second side walls along the back channel. The method may further include assembling one or more a top wall, a back wall, and a bottom wall piece-by-piece and/or modularly to the first and second side walls that are mounted along the back channel.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A storage system comprising:
   a back channel including opposing upper and lower members joined by a back member, the back member configured to be mountable along a support surface;
   a side wall having an upper edge and back edge, the side wall having a hole therethrough below the upper edge and adjacent to the back edge, the side wall including a connector arranged to be received within and coupled to an upper back corner portion of the side wall adjacent to the upper edge, the connector arranged to receive the lower member of the back channel therein for mounting the side wall along the back channel; and
   a back wall having a back surface and a side edge, the back surface having an opening adjacent to the hole and configured to receive a fastener for coupling the back wall to the side wall.

2. The storage system of claim 1, wherein the upper edge of the side wall is aligned between the opposing upper and lower members of the back channel.

3. The storage system of claim 1, wherein the connector does not extend outwardly beyond the side wall.

4. The storage system of claim 1, wherein the connector includes an upper portion, a lower portion, and a slot generally between the upper and lower portions, wherein the slot is configured to receive the lower member of the back channel.

5. The storage system of claim 4, wherein the upper portion of the connector is configured to be received within the back channel generally between the upper and lower opposing members.

6. The storage system of claim 4, wherein an interference, friction, or snap fit is created between the upper portion of the connector and the upper and lower opposing members of the back channel when the connector is engaged with the back channel.

7. The storage system of claim 1, wherein the connector is configured to support a weight of the side wall when the connector is engaged with the back channel.

8. The storage system of claim 1, wherein the connector has a width less than a width of the upper edge.

9. The storage system of claim 1, wherein the opening is H-shaped.

10. The storage system of claim 1, further comprising a top wall having a back portion, the back channel configured to receive the back portion of the top wall therein.

11. The storage system of claim 1, further comprising a top wall including one or more slot-in channels along a side edge portion thereof for coupling the top wall to the side wall.

12. A storage system comprising:
    a back channel including opposing upper and lower members joined by a back member, the back member configured to be mountable along a support surface;
    a side wall having an upper edge and back edge, the side wall having a hole therethrough below the upper edge and adjacent to the back edge;
    a connector arranged to be received within and coupled to an upper back corner portion of the side wall adjacent to the upper edge, wherein the connector does not extend outwardly beyond the side wall and has a width less than a width of the upper edge, the connector including an upper portion, a lower portion, and a slot generally between the upper and lower portions, wherein the slot is configured to receive the lower member of the back channel therein for mounting the side wall along the back channel; and
    a back wall having a back surface and a side edge, the back surface having an opening adjacent to the hole and configured to receive a fastener for coupling the back wall to the side wall.

13. The storage system of claim 12, wherein the upper edge of the side wall is aligned between the opposing upper and lower members of the back channel.

14. The storage system of claim 12, wherein the upper portion of the connector is configured to be received within the back channel generally between the upper and lower opposing members.

15. The storage system of claim 12, wherein the connector is configured to support a weight of the side wall when the connector is engaged with the back channel.

16. The storage system of claim 12, wherein an interference, friction, or snap fit is created between the upper portion of the connector and the upper and lower opposing members of the back channel when the connector is engaged with the back channel.

17. A storage system comprising:
- a back channel including opposing upper and lower members joined by a back member, the back member configured to be mountable along a support surface;
- a side wall having an upper edge and back edge, the side wall having a hole therethrough below the upper edge and adjacent to the back edge;
- a connector arranged to be received within and coupled to an upper back corner portion of the side wall adjacent to the upper edge, wherein the connector does not extend outwardly beyond the side wall and has a width less than a width of the upper edge, the connector including an upper portion, a lower portion, and a slot generally between the upper and lower portions, wherein the slot is configured to receive the lower member of the back channel therein for mounting the side wall along the back channel;
- a back wall having a back surface and a side edge, the back surface having an opening adjacent to the hole and configured to receive a fastener for coupling the back wall to the side wall; and
- a top wall having a back portion and a side edge portion, wherein the top wall is configured to be coupled to the side wall via at least one of the back portion and the side edge portion.

18. The storage system of claim 17, wherein the back channel is configured to receive the back portion of the top wall therein.

19. The storage system of claim 17, wherein the top wall includes at least one slot-in channel along the side edge portion for coupling the top wall to the side wall.

20. The storage system of claim 19, wherein the at least one slot-in channel includes one or more L-shaped slots configured for slidably receiving an end portion of a shelf support peg or pin.

* * * * *